(12) United States Patent
Yun

(10) Patent No.: US 11,488,598 B2
(45) Date of Patent: Nov. 1, 2022

(54) DISPLAY DEVICE AND METHOD FOR CONTROLLING SAME

(71) Applicant: SAMSUNG ELECTRONICS CO., LTD., Suwon-si (KR)

(72) Inventor: Youngsoo Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/959,493

(22) PCT Filed: Jan. 3, 2019

(86) PCT No.: PCT/KR2019/000108
§ 371 (c)(1),
(2) Date: Jul. 1, 2020

(87) PCT Pub. No.: WO2019/135623
PCT Pub. Date: Jul. 11, 2019

(65) Prior Publication Data
US 2021/0056969 A1  Feb. 25, 2021

(30) Foreign Application Priority Data

Jan. 4, 2018  (KR) .................. 10-2018-0001164

(51) Int. Cl.
*G10L 15/22* (2006.01)
(52) U.S. Cl.
CPC .................................. *G10L 15/22* (2013.01)
(58) Field of Classification Search
CPC .................................................... G10L 15/22
See application file for complete search history.

(56) References Cited

U.S. PATENT DOCUMENTS 6,727,884 B1    4/2004 Leatham et al.
2008/0059195 A1  3/2008 Brown
(Continued)

FOREIGN PATENT DOCUMENTS

KR      10-0768653 B1    10/2007
KR    10-2015-0054190 A   5/2015
(Continued)

OTHER PUBLICATIONS

International Search Report (PCT/ISA/210) dated Apr. 19, 2019 by the International Searching Authority in counterpart International Patent Application No. PCT/KR2019/000108.
(Continued)

*Primary Examiner* — Ibrahim Siddo
(74) *Attorney, Agent, or Firm* — Sughrue Mion, PLLC

(57) ABSTRACT

The present disclosure relates to a display device. The display device includes a display; a signal receiver configured to receive a user's voice signal through at least one of a plurality of devices; and a processor configured to: display an image of at least one of a plurality of programs on the display by executing the plurality of programs, identify a program corresponding to a device receiving the voice signal among the plurality of programs based on matching information set by the user regarding a mutual correspondence between the plurality of programs and the plurality of devices, in response to the user's voice signal received through any one of the plurality of devices, and control the identified program to operate according to a user command corresponding to the received voice signal. Thereby, it is possible to control a control target program to a user's intention according to a voice command even if a user who inputs the voice command does not separately designate the control target program.

13 Claims, 23 Drawing Sheets

(56) References Cited

U.S. PATENT DOCUMENTS

| | | | |
|---|---|---|---|
| 2012/0316876 A1* | 12/2012 | Jang | H04N 21/42203 704/E15.001 |
| 2013/0041665 A1* | 2/2013 | Jang | H04N 21/482 704/E15.001 |
| 2013/0073293 A1 | 3/2013 | Jang et al. | |
| 2014/0259029 A1 | 9/2014 | Choi et al. | |
| 2018/0173178 A1* | 6/2018 | Mushikabe | G05B 15/02 |

FOREIGN PATENT DOCUMENTS

| | | |
|---|---|---|
| WO | 2012/056198 A1 | 5/2012 |
| WO | 2012/169679 A1 | 12/2012 |

OTHER PUBLICATIONS

Communication dated Dec. 9, 2020, from the European Patent Office in European Application No. 19736272.6.

Communication dated Jul. 11, 2022 issued by the Korean Intellectual Property Office in Korean English Application No. 10-2018-0001164.

* cited by examiner

FIG. 6

|  | PROGRAM 1 | PROGRAM 2 | PROGRAM 3 | PROGRAM 4 |
| --- | --- | --- | --- | --- |
| DEVICE 1 | O |  |  |  |
| DEVICE 2 |  |  | O |  |
| DEVICE 3 |  | O |  | O |

FIG. 15
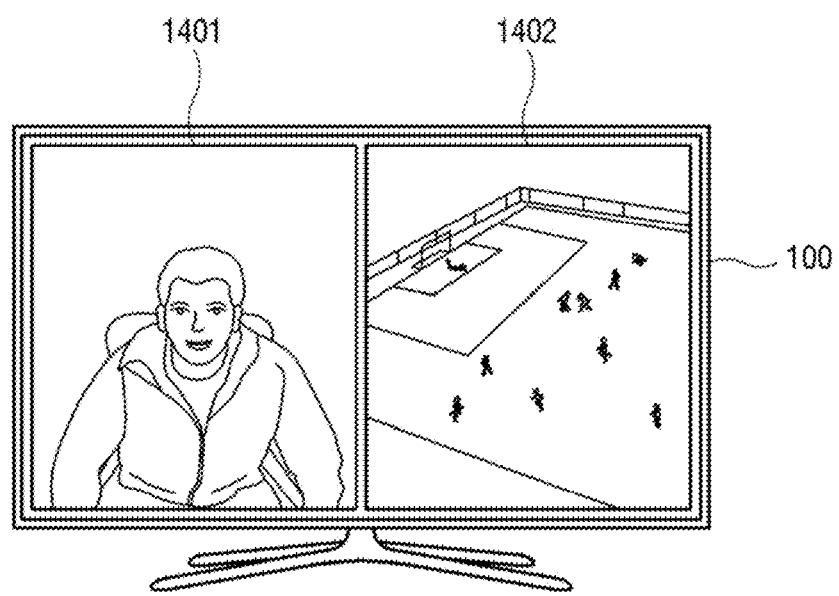
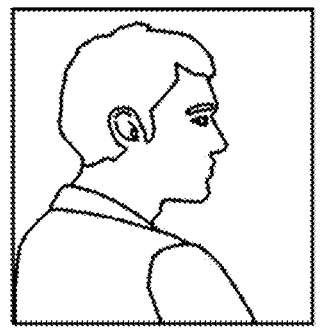

FIG. 16
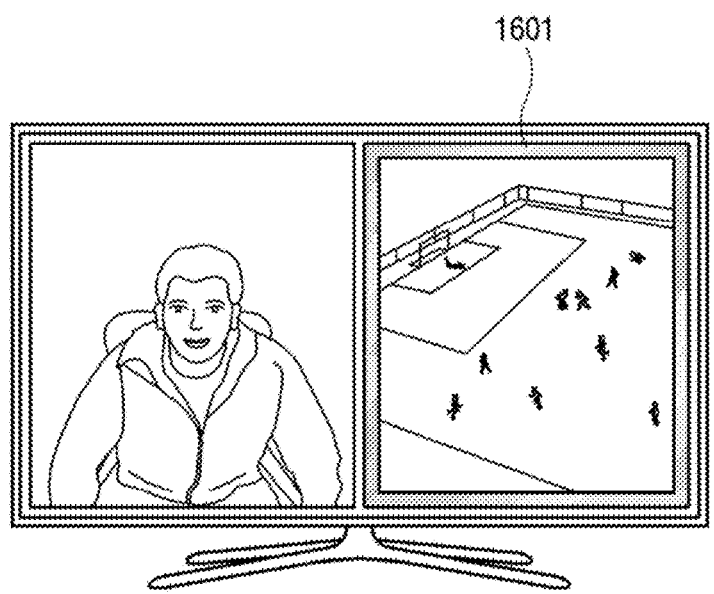
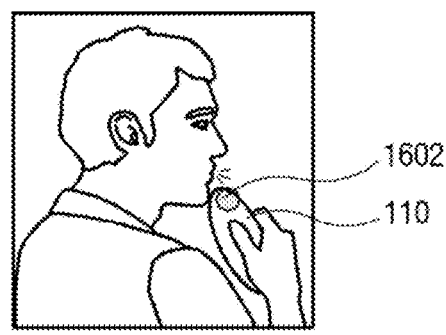

FIG. 19
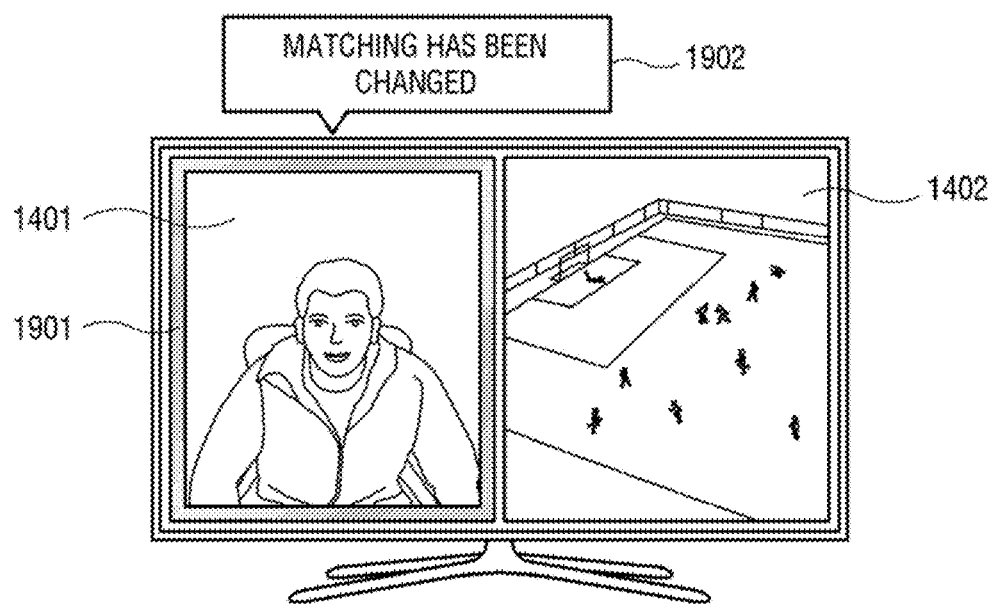
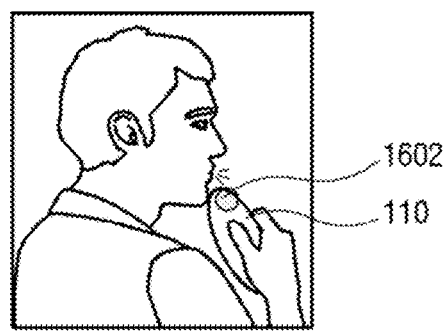

DISPLAY DEVICE AND METHOD FOR CONTROLLING SAME

TECHNICAL FIELD

The present disclosure relates to a display device and a method for controlling the same, and more particularly, to a display device that may be controlled through voice and a method for controlling the same.

BACKGROUND ART

With the introduction of voice recognition technology, electronic devices can be controlled through voice. For example, a user watching TV may control a TV by voice. Furthermore, since a user watches a TV at a certain distance from a screen, control voice for the TV is often input through a microphone that is provided in a small control device such as a remote control or a mobile phone.

Meanwhile, due to the advent of a smart TV, specifications of TV are becoming more and more sophisticated, and the TV can also support a multi-tasking function.

When the multi-tasking function and a voice recognition control function of the TV are combined, some confusion may occur. For example, when the voice is input while several programs are being executed on the TV at the same time, unlike a case where a touch input, such as directly selecting a part of a screen, is received, it is difficult for the TV that has received a voice input to determine which program the voice is used to control.

DISCLOSURE

Technical Problem

Accordingly, the present disclosure is to provide a display device that controls a control target program to user's intention according to a voice command even if a user does not separately designate the control target program when the user's voice command is received during the execution of a plurality of programs.

Technical Solution

According to an aspect of the present disclosure, a display device includes: a display; a signal receiver configured to receive a user's voice signal through at least one of a plurality of devices; and a processor configured to: display an image of at least one of a plurality of programs on the display by executing the plurality of programs, identify a program corresponding to a device receiving the voice signal among the plurality of programs based on matching information set by the user regarding a mutual correspondence between the plurality of programs and the plurality of devices, in response to the user's voice signal received through any one of the plurality of devices, and control the identified program to operate according to a user command corresponding to the received voice signal.

Thereby, when the user's voice command is received while the plurality of programs are being executed on the display device, the user may control the control target program to the user's intention according to the voice command even if the user separately designates the control target program and does not input the voice command.

In addition, it is possible to simply identify a mutual correspondence between the device and the program by referring to the matching information. In addition, since the matching programs corresponding to each device are set, even if a user's voice is received through a plurality of devices at the same time, each voice may control a desired target without collision.

The display device may be configured to further include a user input, and the processor may display a UI setting the matching information on the display, and set the matching information according to a user's input through the user input based on the UI.

Thereby, the correspondence between the device and the program is set by the user, so it is possible to perform the voice control by more clearly reflecting the user's intention.

The matching information may include information on a device set as a main device and a device not set as the main device among the plurality of devices, and the processor may be configured to identify, as the program corresponding to the main device, a program executed in a mode in which an image is displayed among a plurality of programs being executed.

Accordingly, it is possible to improve reliability of program control by reflecting additional information on the plurality of devices on the matching information.

The processor may be configured to receive an execution command for a first program from a first device to execute the first program, and identify the first program as a program corresponding to the first device when the voice signal is received through the first device.

Thereby, it is possible to efficiently identify the program corresponding to the device receiving the voice signal based on the information of the device transmitting the execution command for the program.

The processor may be configured to identify the program corresponding to the device receiving the voice signal based on a category of a main function of the device receiving the voice signal.

Thereby, it is possible to improve the reliability of identifying the control target program to the user's voice input intention in consideration of the main function of the device receiving the user's voice.

The processor may be configured to identify the program corresponding to the device receiving the voice signal based on location information of the device receiving the voice signal with respect to the display.

Thereby, it is possible to more efficiently identify the control target program to the user's voice input intention by reflecting the location of the device receiving the user's voice signal.

The processor may be configured to identify the program corresponding to the device receiving the voice signal by further referring to user's utterance content corresponding to the voice signal.

Thereby, the program corresponding to the utterance content uttered by the user among the plurality of programs can be identified by referring to the utterance content, so it is possible to improve the reliability of the program identification.

The processor may be configured to identify the user command corresponding to the received voice signal by further referring to information on the identified program.

Thereby, by using the information on the program identified as the program corresponding to the device receiving the voice signal to identify the user command, the speed of identifying the user command is improved, and as a result, the processing speed of the display device through the voice recognition can be also improved.

According to another aspect of the present disclosure, a method for controlling a display device includes: displaying an image of at least one of a plurality of programs by executing the plurality of programs; receiving a user's voice signal through any one of a plurality of devices; identifying a program corresponding to a device receiving the voice signal among the plurality of programs based on matching information set by the user regarding a mutual correspondence between the plurality of programs and the plurality of devices, in response to the user's voice signal received through any one of the plurality of devices; and controlling the identified program to operate according to a user command corresponding to the received voice signal.

Thereby, when the user's voice command is received while the plurality of programs are being executed on the display device, the user may control the control target program to the user's intention according to the voice command even if the user separately designates the control target program and does not input the voice command.

In addition, it is possible to simply identify the mutual correspondence between the device and the program by referring to the matching information. In addition, since the matching programs corresponding to each device are set, even if the user's voice is received through the plurality of devices at the same time, each voice can control a desired target without collision.

The control method may further include: displaying a UI setting the matching information; and setting the matching information according to a user's input based on the UI.

Thereby, the correspondence between the device and the program is set by the user, so it is possible to perform the voice control by more clearly reflecting the user's intention.

The matching information may include information on a device set as a main device and a device not set as the main device among the plurality of devices, and in the identifying, a program executed in a mode in which an image is displayed among a plurality of programs being executed may be identified as a program corresponding to the main device.

Accordingly, it is possible to improve the reliability of the program control by reflecting additional information on the plurality of devices on the matching information.

In the identifying, an execution command for a first program from a first device may be received to execute the first program, and the first program may be identified as a program corresponding to the first device when the voice signal is received through the first device.

Thereby, it is possible to efficiently identify the program corresponding to the device receiving the voice signal based on the information of the device transmitting the execution command for the program.

In the identifying, the program corresponding to the device receiving the voice signal may be identified based on a category of a main function of the device receiving the voice signal.

Thereby, it is possible to improve the reliability of identifying the control target program to the user's voice input intention in consideration of the main function of the device receiving the user's voice.

In the identifying, the program corresponding to the device receiving the voice signal may be identified based on location information of the device receiving the voice signal with respect to the display unit.

Thereby, it is possible to more efficiently identify the control target program to the user's voice input intention by reflecting the location of the device receiving the user's voice signal.

In the identifying, the program corresponding to the device receiving the voice signal may be identified by further referring to the user's utterance content corresponding to the voice signal.

Thereby, the program corresponding to the utterance content uttered by the user among the plurality of programs can be identified by referring to the utterance content, so it is possible to improve the reliability of the program identification.

In the identifying, it is possible to identify the user command corresponding to the received voice signal by further referring to the information on the identified program.

Thereby, by using the information on the program identified as the program corresponding to the device receiving the voice signal to identify the user command, the speed of identifying the user command is improved, and as a result, the processing speed of the display device through the voice recognition can be also improved.

A computer program according to the embodiment of the present disclosure is a computer program stored in a medium to execute the control method by being combined with the display device.

The computer program is stored in the medium in the server and may be downloaded to the display device through the network.

Advantageous Effects

As described above, according to the present disclosure, it is possible to control the control target program to the user's intention according to the voice command even if the user who inputs the voice command does not separately designate the control target program.

DESCRIPTION OF DRAWINGS

FIG. 6 is a diagram illustrating an example of matching information according to an embodiment of the present disclosure.

FIGS. 15 to 17 are diagrams illustrating an example in which the processor according to an embodiment of the present disclosure displays the determined program.

FIGS. 18 and 19 are diagrams illustrating another example in which the processor according to the embodiment of the present disclosure sets a program.

MODE FOR DISCLOSURE

Figure 1:
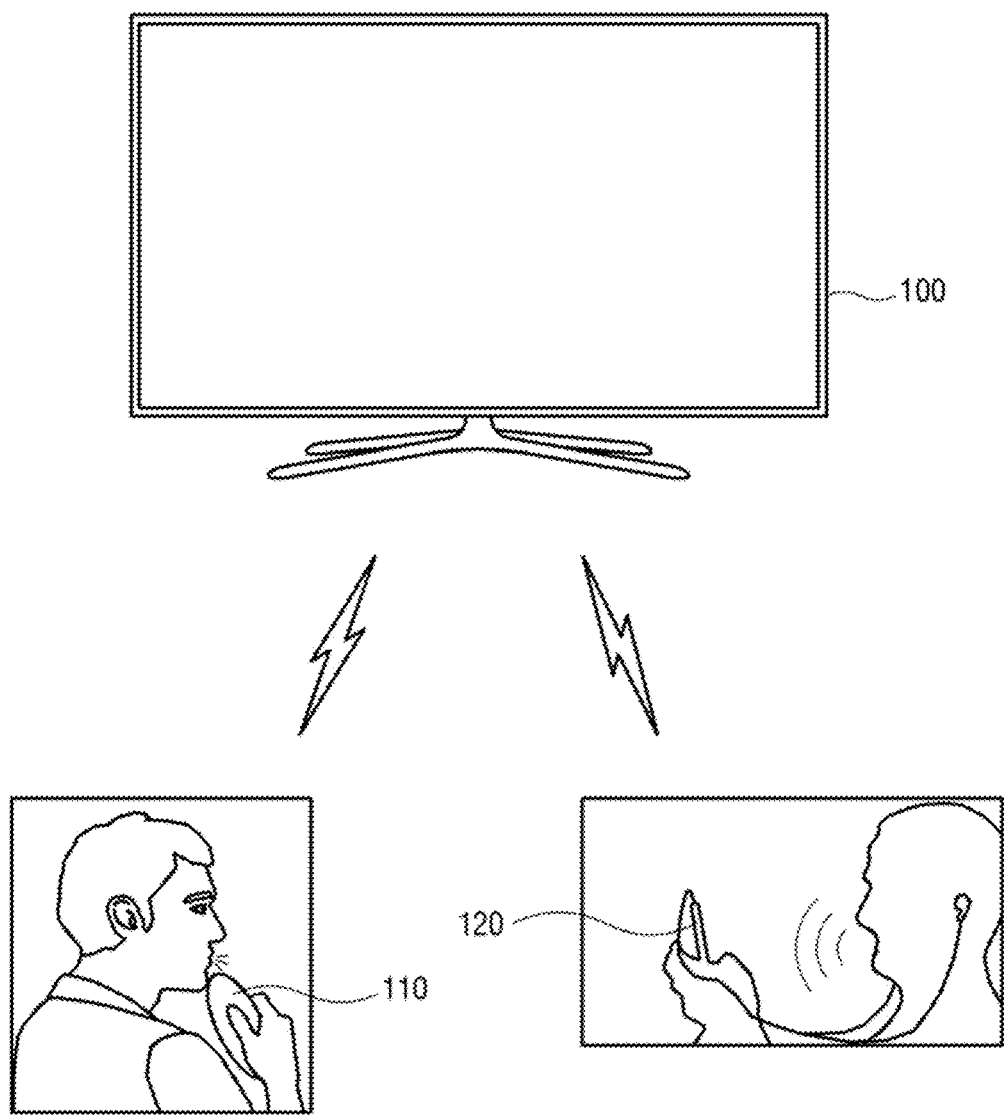
FIG. 1 is a diagram illustrating a display device according to an embodiment of the present disclosure.

Hereinafter, embodiments of the present disclosure will be described in detail with reference to the accompanying drawings. In the drawings, the same reference numbers or signs refer to components that perform substantially the same function, and the size of each component in the drawings may be exaggerated for clarity and convenience. However, the technical idea of the present disclosure and the core configuration and operation thereof are not limited only to the configuration or operation described in the following examples. In describing the present disclosure, if it is determined that a detailed description of the known technology or configuration related to the present disclosure may unnecessarily obscure the subject matter of the present disclosure, the detailed description thereof will be omitted.

In embodiments of the present disclosure, terms including ordinal numbers such as first and second are used only for the purpose of distinguishing one component from other components, and singular expressions include plural expressions unless the context clearly indicates otherwise. Also, in embodiments of the present disclosure, it should be understood that terms such as 'configured', 'include', and 'have' do not preclude the existence or addition possibility of one or more other features or numbers, steps, operations, components, parts, or combinations thereof. In addition, in embodiments of the present disclosure, a 'module' or a 'unit' performs at least one function or operation, and may be implemented in hardware or software, or a combination of hardware and software, and may be integrated into at least one module and implemented as at least one processor. In addition, in embodiments of the present disclosure, at least one of the plurality of elements refers to not only all of the plurality of elements, but also each one or all combinations thereof excluding the rest of the plurality of elements. A term "configured (or set) to" may not necessarily mean only "specifically designed to" in hardware. Instead, in some cases, an expression "a device configured to" may mean that the device may "do" together with other devices or components. For example, a "processor configured (or set) to perform A, B, and C" may mean a dedicated processor (for example, an embedded processor) for performing the corresponding operations or a generic-purpose processor (for example, a CPU or an application processor) that may perform the corresponding operations by executing one or more software programs stored in a memory device.

FIG. 1 illustrates a display device according to an embodiment of the present disclosure. A display device 100 according to an embodiment of the present disclosure may be implemented as, for example, a TV. In addition, the display device 100 according to another embodiment of the present disclosure may be implemented as wearable devices such as an electronic frame, a digital billboard, a large format display (LFD), a digital signage, a smartphone, a tablet, a mobile phone, a smart watch, and a head-mounted display, and devices capable of outputting images of content such as a computer, a multimedia player, a set-top box, and a refrigerator. However, the display device 100 according to the embodiment of the present disclosure is not limited thereto, and any display device capable of displaying an image may be used.

The display device 100 according to the embodiment of the present disclosure may receive a user's voice signal through external devices 110 and 120. For example, the display device 100 may receive the user's voice signal through a remote control 110 or a mobile phone 120. However, a device that the display device 100 can use as a medium for receiving a voice is not limited thereto, and any device that can receive a user's voice and transmit the user's voice to the display device 100 can be used. In addition, the display device 100 may include a voice receiving unit to directly receive a user's voice.

Figure 2:
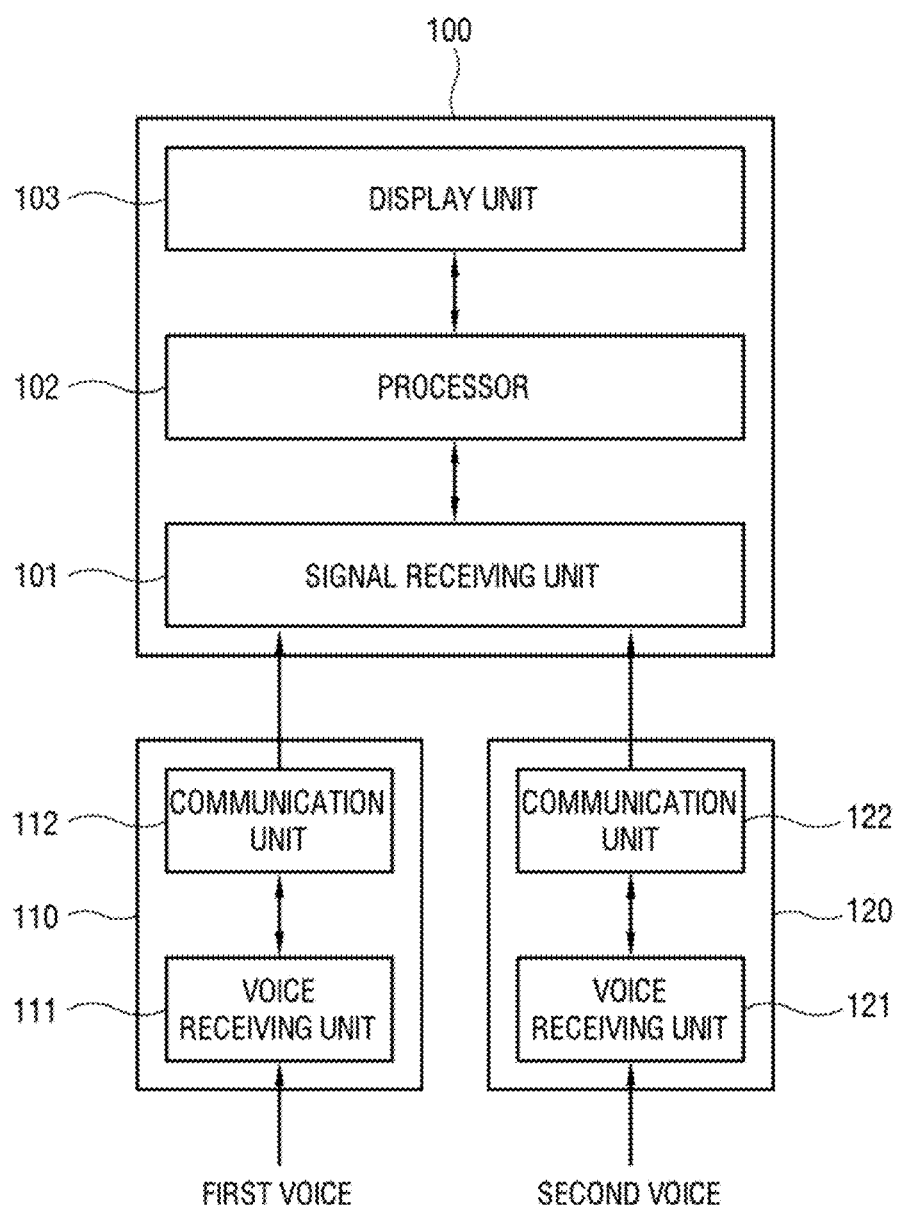
FIG. 2 is a diagram illustrating a configuration of the display device according to the embodiment of the present disclosure.

FIG. 2 is a block diagram illustrating a configuration of the display device according to the embodiment of the present disclosure. The display device 100 according to the embodiment of the present disclosure includes a signal receiving unit 101, a processor 102, and a display unit 103. However, the configuration of the display device 100 illustrated in FIG. 2 is only an example, and the display device according to the embodiment of the present disclosure may be implemented in another configuration. That is, the display device 100 according to the embodiment of the present disclosure may be implemented by adding other configurations in addition to the configuration illustrated in FIG. 2 or by excluding a part of the configurations illustrated in FIG. 2. Each configuration in the embodiment of the present disclosure may be implemented in at least one hardware and/or software, and may be implemented as a circuit or a chip.

The signal receiving unit 101 may receive a user's voice signal and transmit the user's voice signal to the processor 102. The signal receiving unit 101 may include a voice receiving unit such as a microphone therein to directly receive a user's voice, and may receive the user's voice signal through external devices 110 and 120 equipped with the voice receiving units 111 and 121 and the communication units 112 and 122. In the latter case, the signal receiving unit 101 may communicate with the external devices 110 and 120 in a wired or wireless manner. In this case, the signal receiving unit 101 and the communication units 112 and 122 of the external device may include various other communication modules in addition to a connection unit including a connector or a terminal for wired connection. For example, the signal receiving unit 101 and the communication units 112 and 122 of the external device may include communication modules such as Wi-Fi, WiFi direct, Bluetooth, Bluetooth low energy (BLE), serial port profile (SPP), Zigbee, infrared communication, radio control, ultra-wide band (UWM), wireless USB, and near field communication (NFC). When the display device 100 also communicates with devices (for example, a server) other than the external devices, the communication unit responsible for communication between the server and the display device 100 may be a communication unit different from or the same communication unit as the communication unit responsible for communication between the external device and the display device 100.

The processor 102 may process the voice signal received by the signal receiving unit 101. Voice signal processing and recognition may be performed using, for example, dynamic time warping (DTW) based voice recognition technology, hidden Markov model (HMM) based voice recognition technology, rule-based approach based voice recognition technology, deep learning based voice recognition technology using a deep neural network (DNN), and the like.

The processor 102 may transmit the received voice signal to a voice recognition server and process the voice signal. The voice recognition server may be implemented as, for example, a speech-to-text server (STT serve). When the voice recognition server is implemented as an STT server, the voice recognition server may be a server performing only a function of the STT server, or a server performing functions other than the function of the STT server.

The voice signal transmitted to the voice recognition server is processed by the server to be converted into data (for example, text corresponding to the voice signal) of a voice command. The data of the voice command processed by the voice recognition server may be transmitted back to the processor 102 or may be transmitted to another server.

The processor 102 may perform the corresponding function using data obtained by processing the received voice signal by itself or the data of the voice command processed by the voice recognition server. The processor 102 may use the voice recognition server or another server during the performance of the function corresponding to the data obtained by processing the voice signal. For example, the processor 102 may transmit text corresponding to the voice signal received from the STT server to the STT server or another server and process the text, and then process a specific function based on the data processed and transmitted by the corresponding server.

The processor 102 may transmit, to the voice recognition server or another server, information on a function of the display device 100 corresponding to the text into which the voice signal is converted. Thereby, the voice recognition server or another server may store information on a function corresponding to the result of the voice recognition in a storage unit, and then provide the information to the display device 100 to perform the corresponding function by referring to the stored information when the same voice command is received.

The processor 102 may process an image. The type of image processing that the processor 102 can perform is not limited. The image processing performed by the processor 102 may include, for example, de-multiplexing that divides an input stream into each sub-stream of image, voice, and additional data, decoding corresponding to an image format of an image stream, de-interlacing that converts an interlace type image stream into a progressive scheme, scaling that adjusts an image stream to a preset resolution, noise reduction for improving image quality, detail enhancement, frame refresh rate conversion, and the like.

The processor 102 may perform control to operate the overall configurations of the display device 100. The processor 102 may include control programs (or instructions) for performing the control operation, a nonvolatile memory in which control programs are installed, a volatile memory in which at least a part of the installed control programs is loaded, and at least one processor or a central processing unit (CPU) by which the loaded control programs are executed. In addition, such a control program may be stored in electronic devices other than the display device 100.

The control program may include a program(s) implemented in at least one of a BIOS, a device driver, an operating system, firmware, a platform, and an application program (application). As an embodiment, the application program may be pre-installed or stored in the display device 100 at the time of manufacturing the display device 100, or installed in the display device 100 based on data of the application program received from the outside when used later. The data of the application program may be downloaded from the external server, such as an application market, to the display device 100, but is not limited thereto. Meanwhile, the processor 102 may be implemented in the form of a device, a S/W module, a circuit, and a chip, or a combination thereof.

The processor 102 may control the signal receiving unit 101 to receive the voice signal from, for example, the external devices 110 and 120. The processor 102 may control the display unit 103 to display the image by executing at least one program. The display device 100 illustrated in FIG. 2 is implemented as a configuration that performs processing and control together in one processor 102, which is only an example, and the display device 100 according to another embodiment of the present disclosure may be implemented in a configuration that further includes a control unit separately from the processing unit.

The display 103 may display an image processed by the processor 102. The implementation scheme of the display unit 103 is not limited, and the display unit 103 may be implemented in various display schemes such as liquid crystal, plasma, light-emitting diode, an organic light-emitting diode, surface-conduction electron-emitter, carbon nano-tube, and nano-crystal. In the case of the liquid crystal scheme, the display unit 103 includes a liquid crystal display panel, a backlight unit that supplies light to the liquid crystal display panel, a panel driving unit that drives the liquid crystal display panel, and the like. The display unit 103 may be implemented as an OLED panel that is a self-luminous element without a backlight unit.

Figure 3:
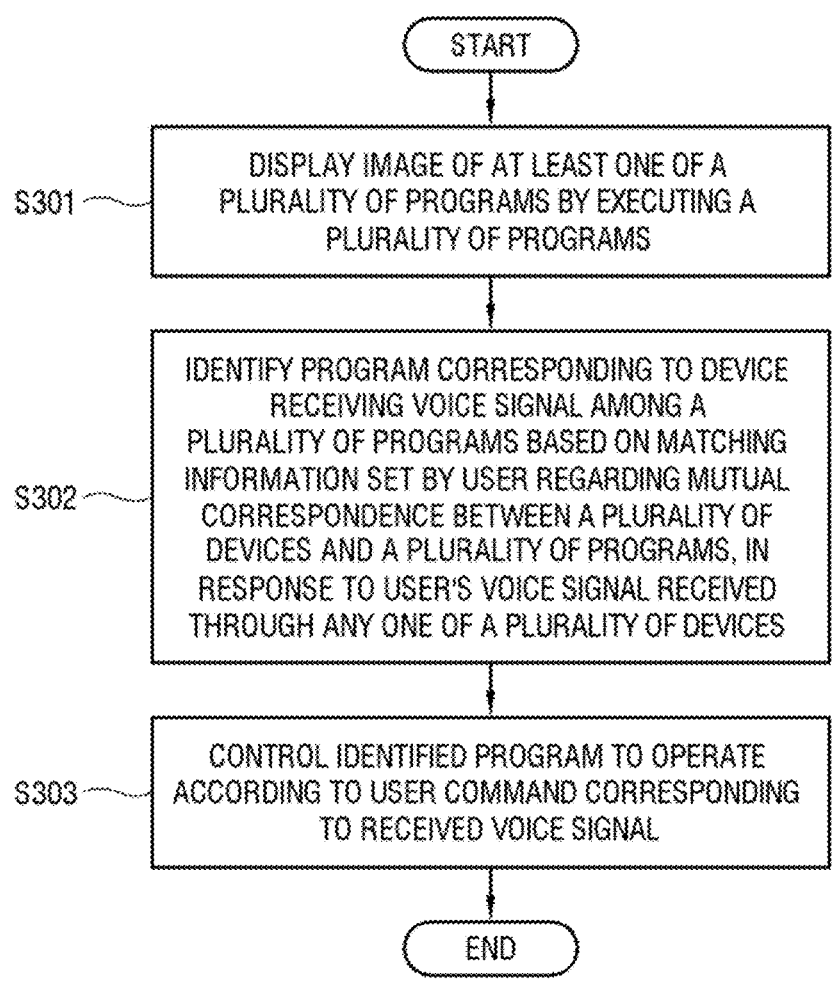
FIG. 3 is a diagram illustrating a control method of a display device according to an embodiment of the present disclosure.

FIG. 3 illustrates a control method of a display device 100 according to an embodiment of the present disclosure.

The processor 102 of the display device 100 according to the embodiment of the present disclosure executes a plurality of programs and displays an image of at least one of the plurality of programs on the display unit 103 (S301). Here, the program may be called an application, software, content, a module, and the like, regardless of a name or type thereof, and any program that can be executed and controlled in the display device 100 may be used.

Figure 4:
FIG. 4 is a diagram illustrating an example of a screen of the display device according to the embodiment of the present disclosure.

FIG. 4 illustrates an example of a screen of the display unit 103 of the display device 100 according to the embodiment of the present disclosure. Two programs are executed on the display device 100 of FIG. 4, and images of the two programs are each displayed on the screen of the display unit 103. That is, the display device 100 of FIG. 4 executes an image playback program 401 and a web browsing program 402 to display images of each program. However, the number and type of programs being executed on the display device 100 and the screen arrangement scheme are not limited thereto. There is no particular limitation in the form of the execution of the program. For example, while one program is being executed, another program may be executed, but may be operated in a background mode in which the corresponding image is not displayed.

Referring back to FIG. 3, the processor 102 identifies or determines a program corresponding to a device receiving a voice signal among the plurality of programs based on matching information regarding a mutual correspondence between the plurality of devices and the plurality of programs, in response to the user's voice signal received through any one of the plurality of devices (S302). The matching information regarding the correspondence between the device receiving the voice signal and the program may be set in advance or may not be set depending on the user, the features of the device, or the like. In the latter case, the processor 102 may determine the program by grasping the correspondence between the device receiving the voice signal and the program in real time according to the situation. Details will be described later.

When the program corresponding to the received voice signal is determined, the processor 102 controls to operate the program determined according to a user command corresponding to the received voice signal (S303). Here, the user command corresponding to the received voice signal may be determined by allowing the processor 120 to directly analyze and process the voice signal, or data regarding the user command processed or determined by the external device may be used. Hereinafter, for convenience of explanation, all of the above cases are expressed as "the processor 102 determines the user command corresponding to the received voice signal." Therefore, hereinafter, the expression "the processor 102 determines the user command corresponding to the received voice signal" may mean that the processor 102 directly analyzes and processes the voice signal and determines the user command corresponding to the voice signal, may mean that the data regarding the user command determined by the external device is used as it is, and may mean that the processor 102 determines the user command corresponding to the voice signal based on the data regarding the user command processed by the external device.

Thereby, when the user's voice command is received while the plurality of programs are being executed on the display device, the user may control the control target program to the user's intention according to the voice command even if the user separately designates the control target program and does not input the voice command.

Hereinafter, an example of a method of determining the program corresponding to the device receiving the voice signal among the plurality of programs will be described in detail.

Figure 5:
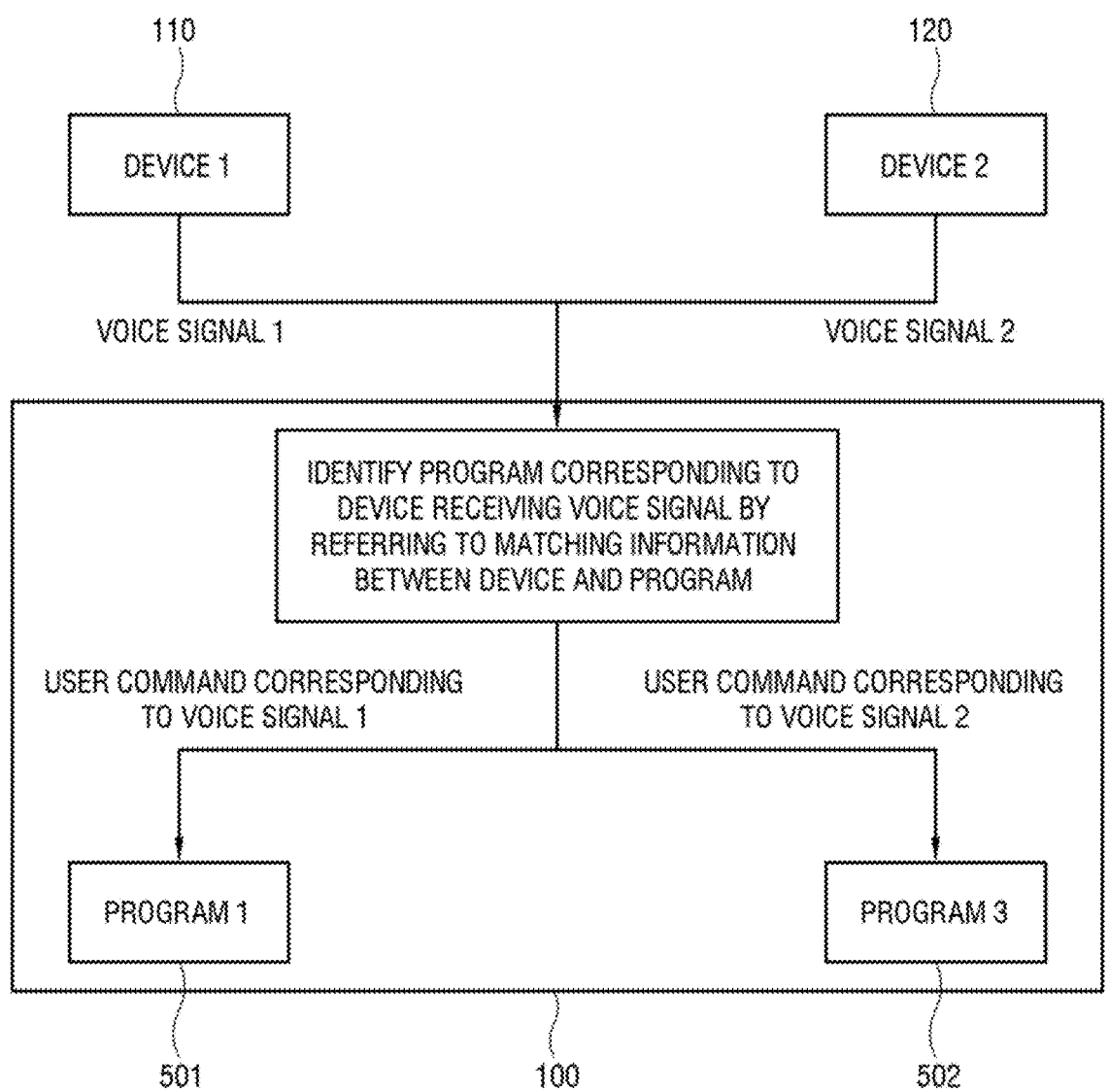
FIG. 5 is a diagram illustrating an example in which a processor according to an embodiment of the present disclosure identifies or determines a program.

FIG. 5 is a diagram illustrating an example in which the processor 102 determines a program according to the embodiment of the present disclosure. As illustrated in FIG. 5, when the display device 100 receives a voice signal 1 and a voice signal 2 from the device 1 110 and the device 2 120, respectively, the processor 102 of the display device 100 according to the embodiment of the present disclosure may determine the program corresponding to the device receiving the voice signal by referring to the matching information regarding the mutual correspondence between the plurality of devices and a plurality of programs. Here, the matching information regarding the mutual correspondence between the plurality of devices and the plurality of programs may take a table or database form in which the information on the program corresponding to each device is set. However, the matching information is not limited thereto in the form, the structure, the content, or the like, and any information that can represent a correspondence between the device and the program can be used.

When the matching information is the same as the table of FIG. 6, the processor 102 may refer to the matching information above to confirm that the device 1 110 corresponds to program 1 501 and the device 2 120 corresponds to program 3 502. Therefore, the processor 102 may determine the program 1 501 as a program corresponding to voice signal 1 received through the device 1 110, and determine the program 3 502 as a program corresponding to voice signal 2 received through the device 2 120.

Thereafter, the processor 102 determines the user commands corresponding to the voice signal 1 and the voice signal 2, respectively, and controls the program 1 501, which is a program corresponding to the voice signal 1, by the user command corresponding to the voice signal 1, and controls the program 3, which is a program corresponding to the voice signal 2, by the user command corresponding to the voice signal 2.

Thereby, the mutual correspondence between the device and the program can be determined simply by referring to the matching information. In addition, since the matching programs corresponding to each device are set, even if a user's voice is received through a plurality of devices at the same time, each voice may control a desired target without collision.

The matching information regarding the mutual correspondence between the device and the program may be directly set by the user. This will be described with reference to FIG. 7.

The display device 100 according to the embodiment of the present disclosure may further include a user input unit. The user input unit may be implemented in various forms according to a user input scheme. For example, the user input unit may be implemented as a keyboard, a mouse, a touch screen, or a touch pad, and furthermore, the user input unit may be implemented as a button that is provided outside the display device 100, a remote control signal receiving unit that receives a remote control signal of a user input received from a remote controller, a camera that detects a user's gesture input, a microphone that recognizes the user's voice input, and the like.

Figure 7:
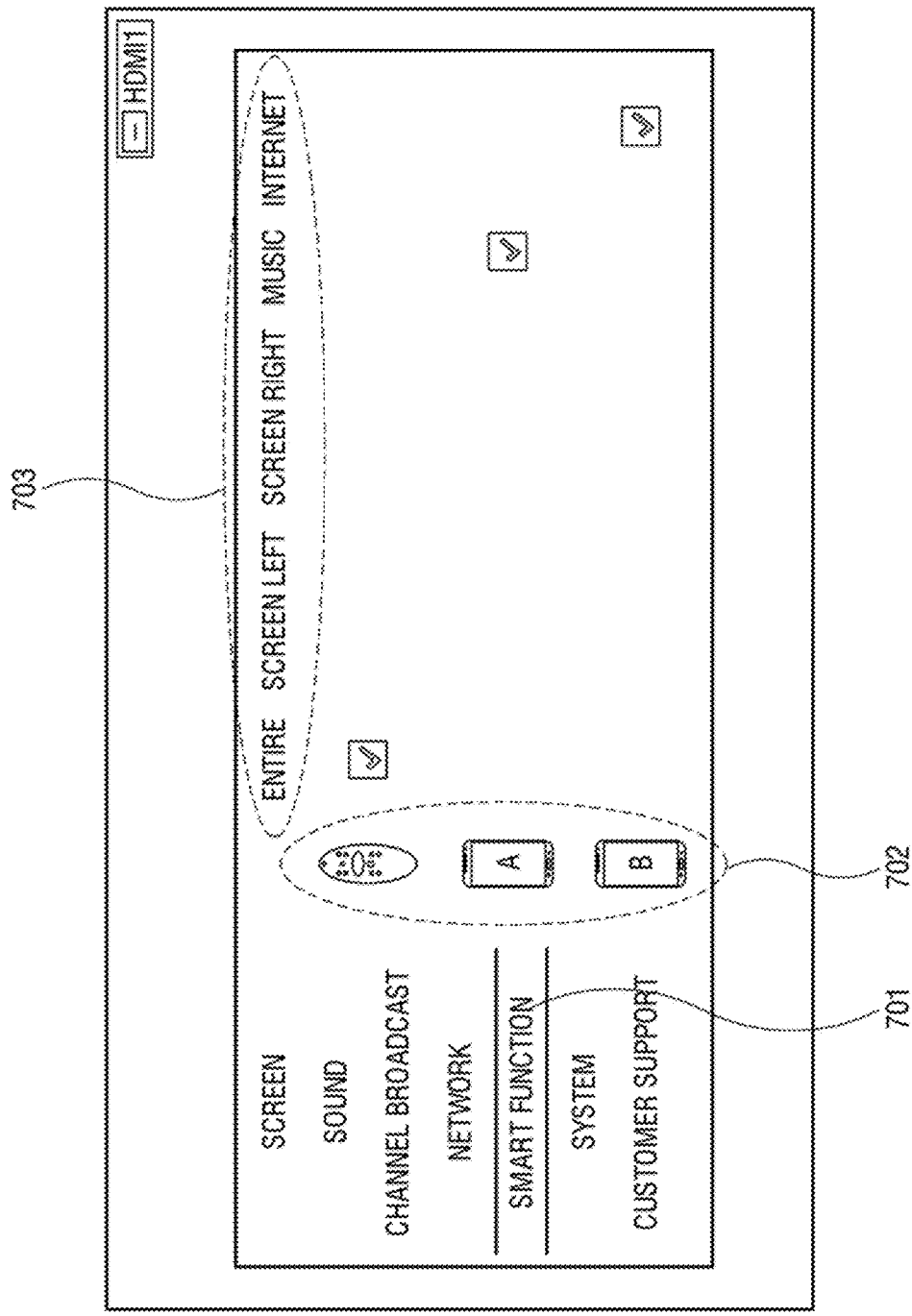
FIG. 7 is a diagram illustrating an example in which the processor according to an embodiment of the present disclosure sets a program.

When the display device 100 according to the embodiment of the present disclosure further includes the user input unit as described above, the processor 102 may display a user interface (UI) capable of setting the matching information on the display unit 103, and set the matching information according to the user input through the user input unit. For example, the processor 102 includes a menu 701 that can set the matching information as one of menu items that can change the setting of the display device 100, as illustrated in FIG. 7, and may set programs corresponding to each device in the corresponding menu according to a user's selection. Specifically, as illustrated in FIG. 7, the processor 102 may set the programs, which the corresponding devices may control, for devices 702 registered or recognized as a device capable of controlling the display device 100, for example, remote control, smartphone 1, and smartphone 2, respectively, according to the user input. FIG. 7 illustrates an example in which 'all' (program displayed and executed on the entire screen of the display device), 'screen left' (program displayed and executed on the left side of the screen of the display device), 'screen right' (program displayed and executed on the right side of the screen of the display device), 'music' (application related to music playback), and 'Internet' (application related to Internet browsing) are presented as a list 703 of programs that can be set for each device, and a user selects one program for each device from the above list 703. However, the types of programs that can be provided as options for each device and the number of programs that can be selected are not limited thereto. In addition, the UI capable of setting the matching information does not need to be provided as one of the menu items, but can be displayed through a separate UI item, for example.

Thereby, the correspondence between the device and the program is set by the user, so it is possible to perform the voice control by more clearly reflecting the user's intention.

The matching information regarding the mutual correspondence between the device and the program may be directly set by the features of the device. Hereinafter, various embodiments of determining the program corresponding to the device receiving the voice signal based on the matching information set by the features of the device will be described.

The matching information further includes information on a device (hereinafter, referred to as a 'main device') which is set as a main device among the plurality of devices and information on a device (hereinafter, referred to as a 'sub device') that is not set as the main device, and the processor 102 of the display device 100 according to the embodiment of the present disclosure may determine the program corresponding to the device receiving the voice signal based on the information. This will be described with reference to FIGS. 8 and 9.

Figure 8:
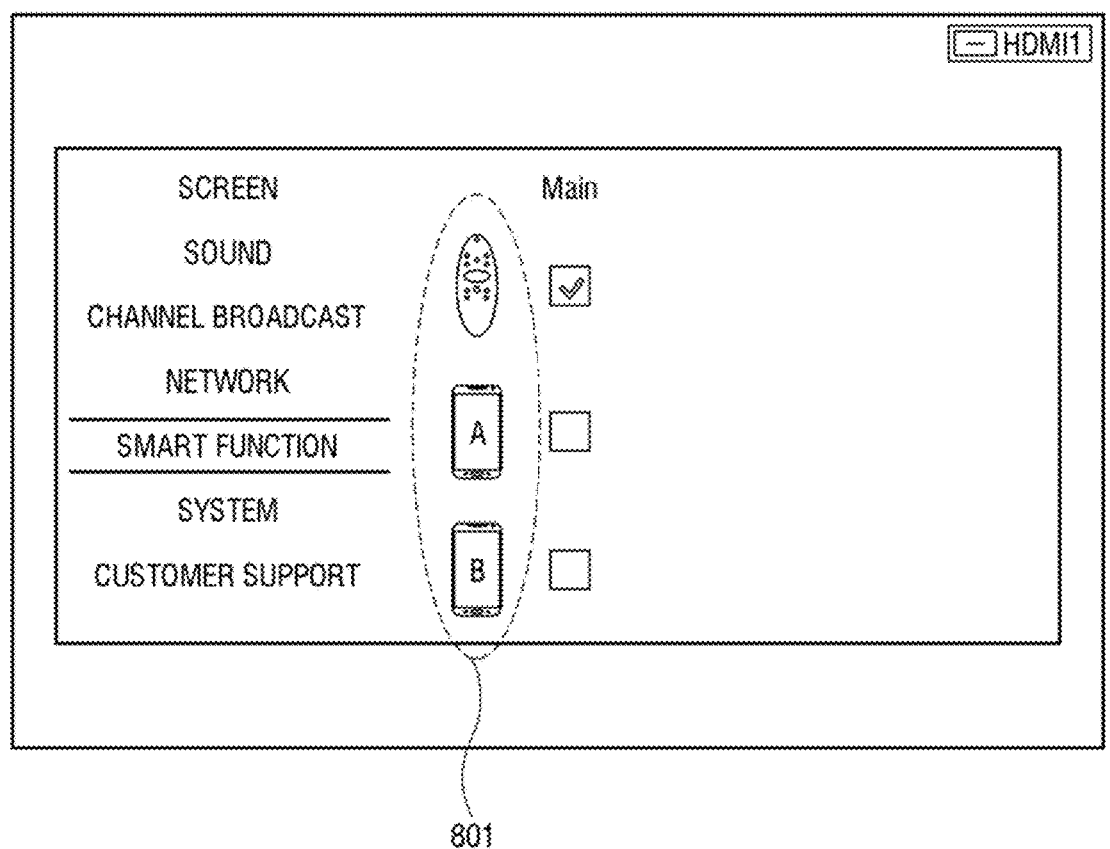
FIG. 8 is a diagram illustrating another example in which the processor according to the embodiment of the present disclosure sets a program.

There is no particular limitation on a method of distinguishing a plurality of devices into a main device and a sub device. For example, the method may be determined, but not limited to, by the user, may be determined according to a pairing order of each device for the display device 100, or may be determined according to a degree of association with the display device 100 (for example, when the display device is a TV, the basic remote control of the TV may be set as the main device, and the remaining devices may be set as the sub device). FIG. 8 is a diagram illustrating the example, and illustrates an example of setting a specific device among a plurality of devices 801 as the main device according to the user input received through the UI.

Figure 9:
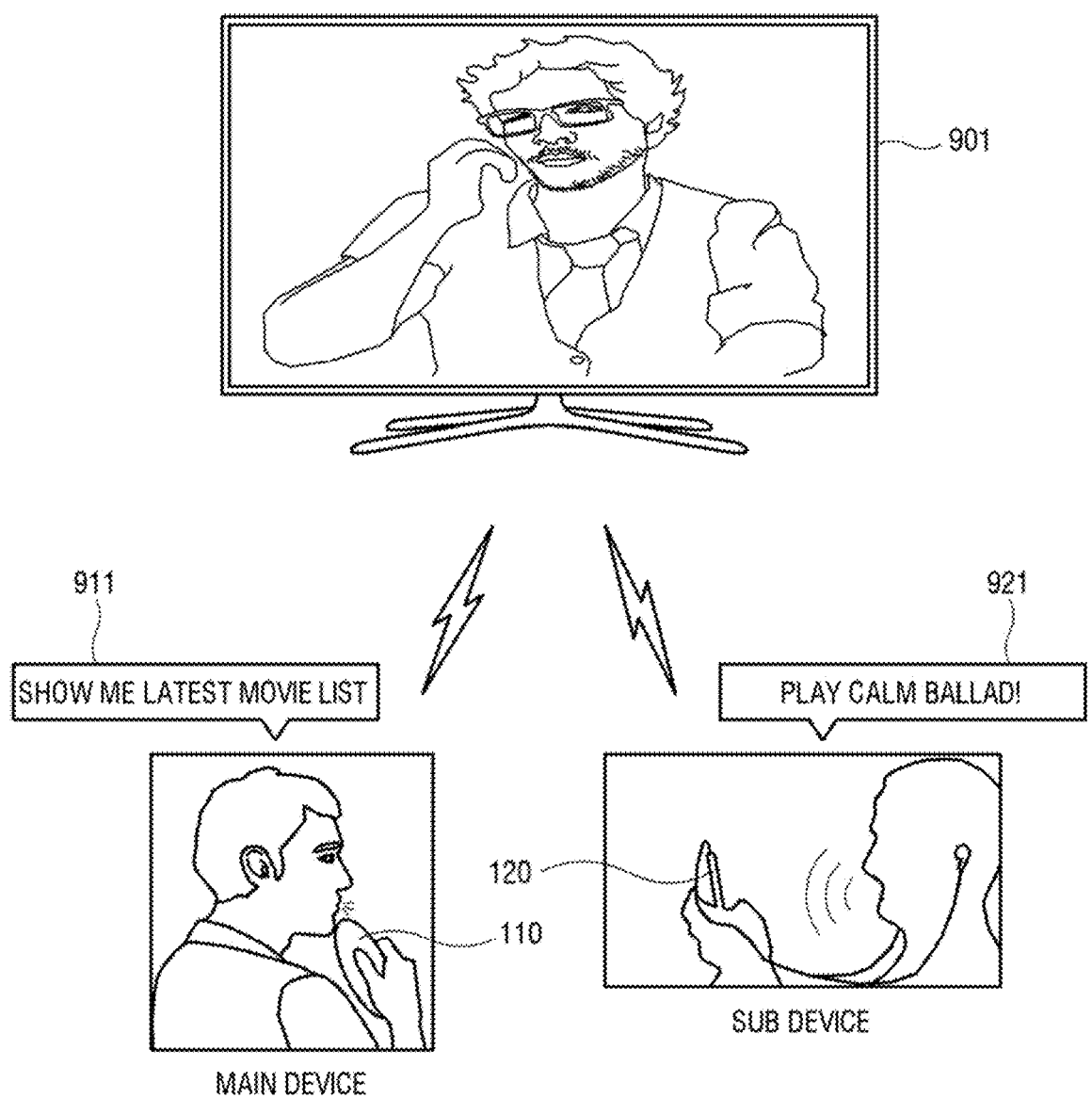
FIG. 9 is a diagram illustrating an example of a state in which the display device according to the embodiment of the present disclosure is used.

As an example of a method of determining a program corresponding to a device receiving a voice signal based on the information on the main device and the sub device, a program being executed in a mode (hereinafter, referred to as 'foreground mode') in which an image is displayed among a plurality of programs being executed on the display device 100 may be determined as the program corresponding to the main device, and a mode (hereinafter, referred to as 'background mode') in which the image is not displayed may be determined as the program corresponding to the sub device. For example, as illustrated in FIG. 9, when in the display device 100, a movie playback program 901 is being executed in the foreground mode, a music playback program is being executed in the background mode, a remote control 910 is set as the main device, and a mobile phone 920 is set as the sub device, the processor 102 determines the program corresponding to the main device as the movie playback program 901 being executed in the foreground mode, and determines the program corresponding to the sub device as the music playback program being executed in the background mode, and then may control the movie playback program 901 by a user command 911 corresponding to the voice signal input through the main device and control the music playback program by a user command 921 corresponding to the voice signal input through the sub device. However, a method of determining a program corresponding to a device receiving a voice signal based on information on the main device and the sub device is not limited thereto. For example, the processor 102 may determine, as the program corresponding to the main device, a program that occupies the most screen among the programs being executed.

Thereby, it is possible to improve reliability of program control by reflecting additional information on the plurality of devices on the matching information.

As another method for the processor 102 of the display device 100 according to the embodiment of the present disclosure to determine the program corresponding to the device receiving the voice signal, when the program of the display device 100 is executed by the external device, the processor 102 may determine the corresponding program by referring to the above information. This will be described with reference to FIGS. 10 and 11.

Figure 10:
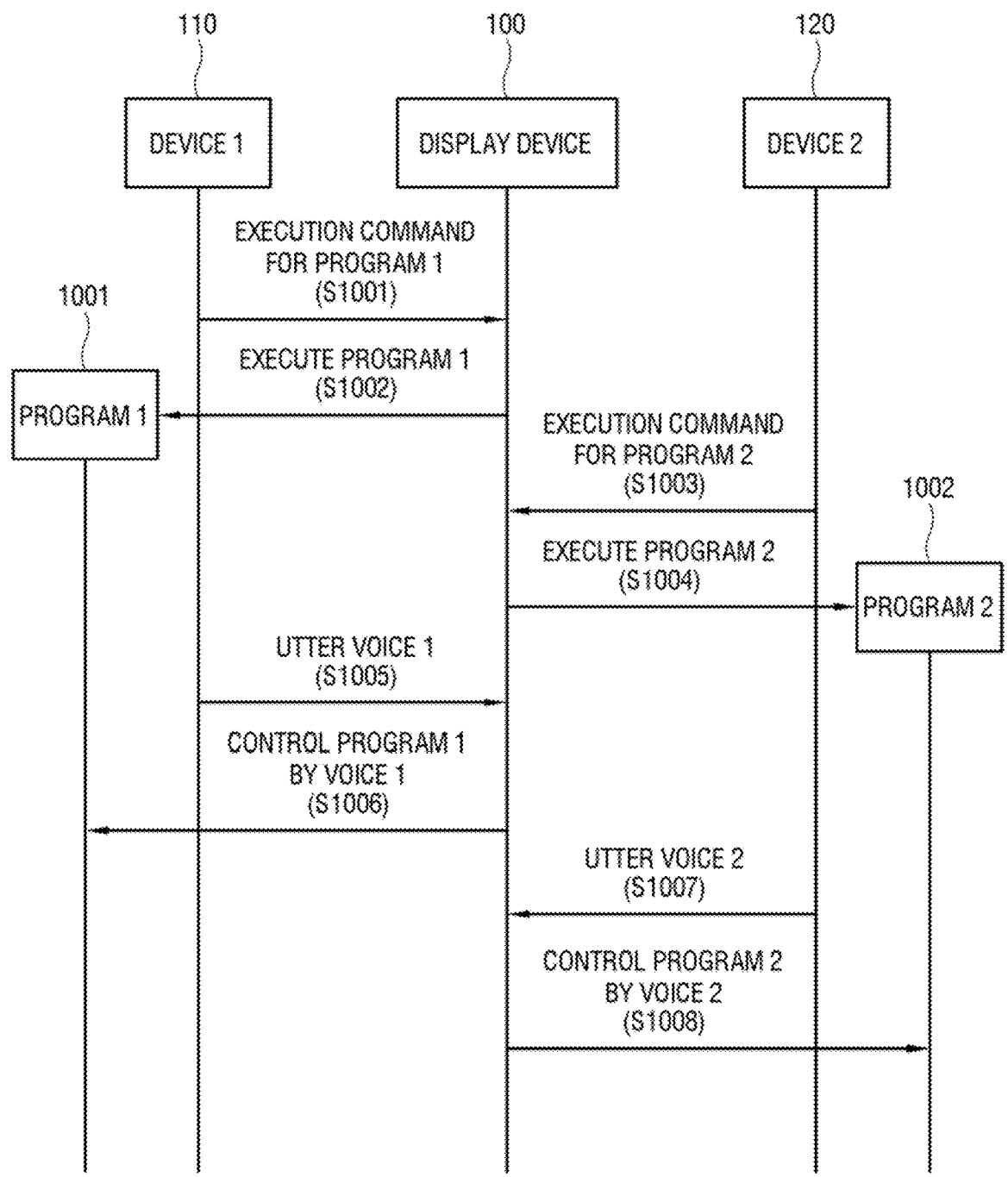
FIGS. 10 and 11 are diagrams illustrating another example in which the processor according to the embodiment of the present disclosure determines a program.
Figure 11:
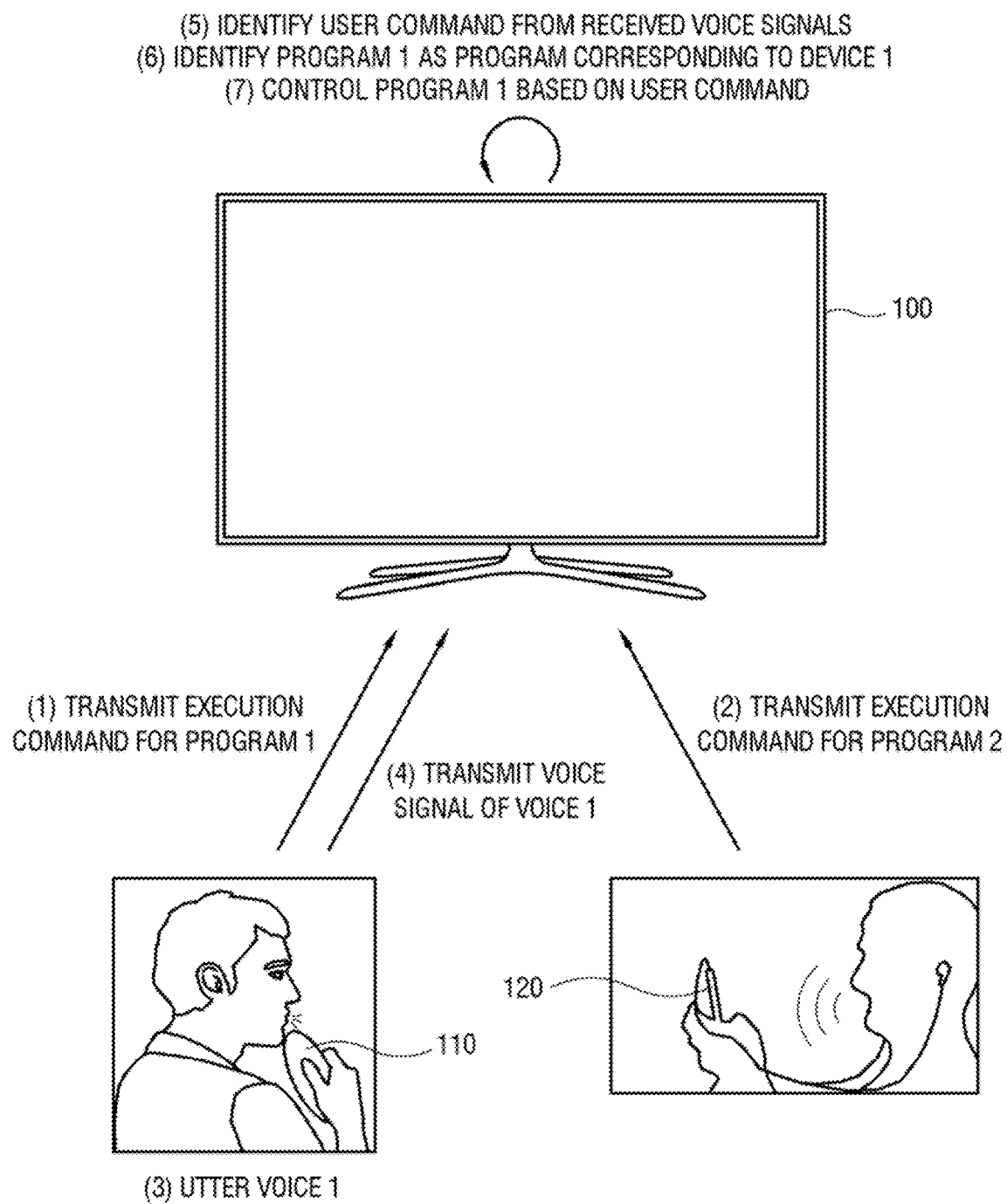

FIGS. 10 and 11 illustrate the embodiment of determining the program corresponding to the device receiving the voice signal in the situation in which the execution commands for program 1 1001 and program 2 1002 from the device 1 110 and the device 2 120, respectively, are received and the program 1 1001 and the program 2 1002 are being executed on the display device 100. Specifically, the processor 102 of the display device 100 receives the execution command for the program 1 from the device 1 110 (S1001), and executes the program 1 1001 accordingly (S1002, (1) of FIG. 11). In addition, the processor 102 receives the execution command for the program 2 from the device 2 120 (S1003), and executes the program 2 1002 accordingly (S1003, (2) of FIG. 11).

In the situation where the program 1 1001 and the program 2 1002 are being executed on the display device 100 through the above process, when the user utters the voice 1 to the device 1 110 ((3) of FIG. 11) and receives the voice signal from the device 1 110 (S1005, (4) of FIG. 11), the processor 102 may determine that the program executed by the device 1 110 among the plurality of programs being executed is the program 1 1001 to determine the program corresponding to the device 1 110 receiving the voice 1 as the program 1 1001 ((6) of FIG. 11) and may control the program 1 1001 based on the voice 1 (S1006, (7) of FIG. 11). Even when the user utters the voice 2 to the device 2 120 (S1007), the processor 102 may perform the same determination to determine the program corresponding to the device 2 120 receiving the voice 2 as the program 2 1002, and control the program 2 1002 based on the voice 2 (S1006). FIG. 10 is a diagram illustrating the above process based on the passage of time, and FIG. 11 is a diagram illustrating the same process in terms of space.

Thereby, it is possible to efficiently determine the program corresponding to the device receiving the voice signal based on the information of the device transmitting the execution command for the program.

Figure 12:
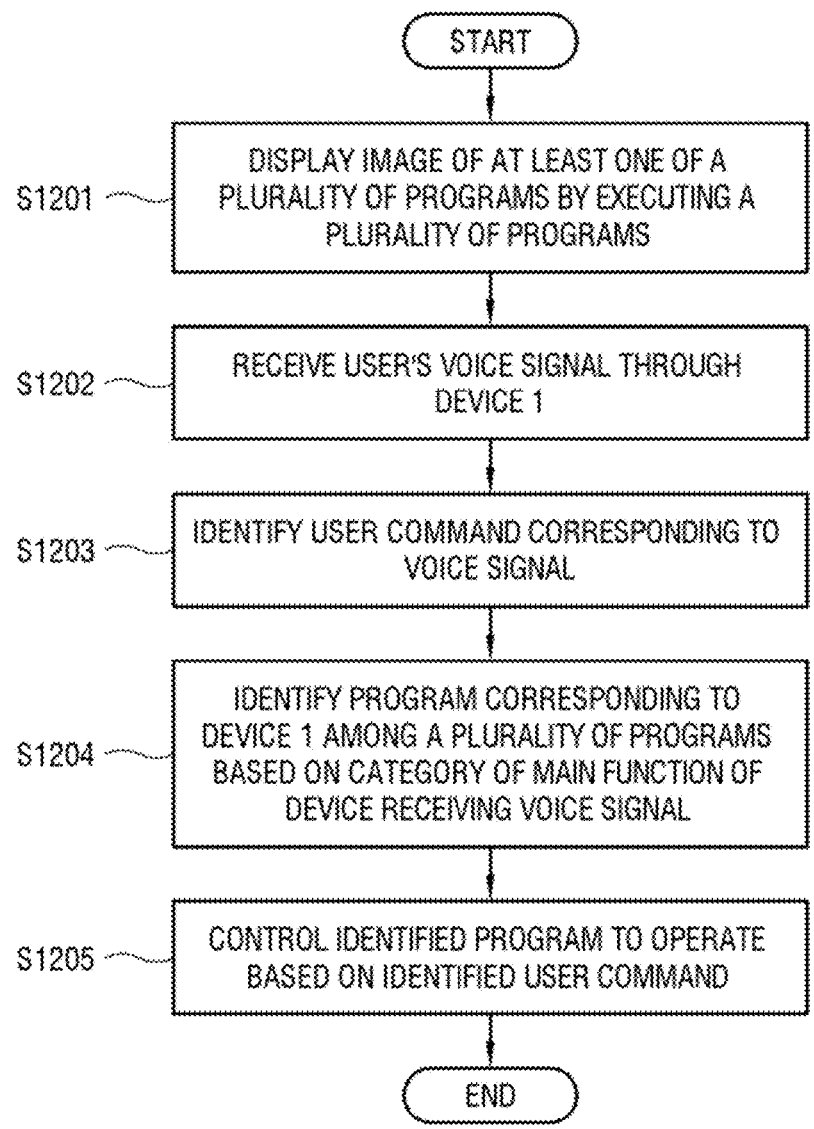
FIGS. 12 to 14 are diagrams illustrating another examples in which the processor according to the embodiment of the present disclosure determines a program.

As another method for the processor 102 of the display device 100 according to the embodiment of the present disclosure to determine the program corresponding to the device receiving the voice signal, the processor 102 may determine the program corresponding to the device receiving the voice signal based on the category of the main function of the device receiving the voice signal. This will be described with reference to FIG. 12.

The processor 102 of the display device 100 according to the embodiment executes the plurality of programs and displays an image of at least one of the plurality of programs on the display unit 103 (S1201). When the user's voice signal is received through the device 1 110 (S1202), the processor 102 determines the user command corresponding to the received voice signal (S1203).

Meanwhile, the processor 102 determines the program corresponding to the device 1 110 among the plurality of programs based on the category of the main function of the device receiving the voice signal (S1204). For example, in the situation in which three programs of a TV broadcast viewing program, a music playback program, and an Internet search program are being executed on the display device 100, when the user's voice signal is received through a TV remote control, the main function of the TV remote control controls the TV, and therefore the processor 102 may grasp the category of the main function as 'TV broadcast' to determine the TV broadcast viewing program closest to the TV broadcast among the three programs being executed as the program corresponding to the TV remote control. As another example, when the user's voice signal is received through a MP3 player in the situation in which the three programs are being executed, the processor 102 may grasp a category of a main function of the MP3 player as 'music' to determine the music playback program among the three programs as the program corresponding to the MP3 player. As another example, when the user's voice signal is received through an electronic device equipped with a keyboard in the situation in which the three programs are being executed, the processor 102 may grasp a category of a main function of the electronic device as 'character input' to determine the Internet search program among the three programs as the program corresponding to the electronic device equipped with the keyboard. However, the plurality of devices and the types of programs being executed are not limited to the above example.

When the user command and the program corresponding to the received voice signal are determined based on the above process, the processor 102 controls to operate the determined program based on the determined user command (S1205).

Thereby, it is possible to improve the reliability of determining the control target program to the user's voice input intention in consideration of the main function of the device receiving the user's voice.

Figure 13:
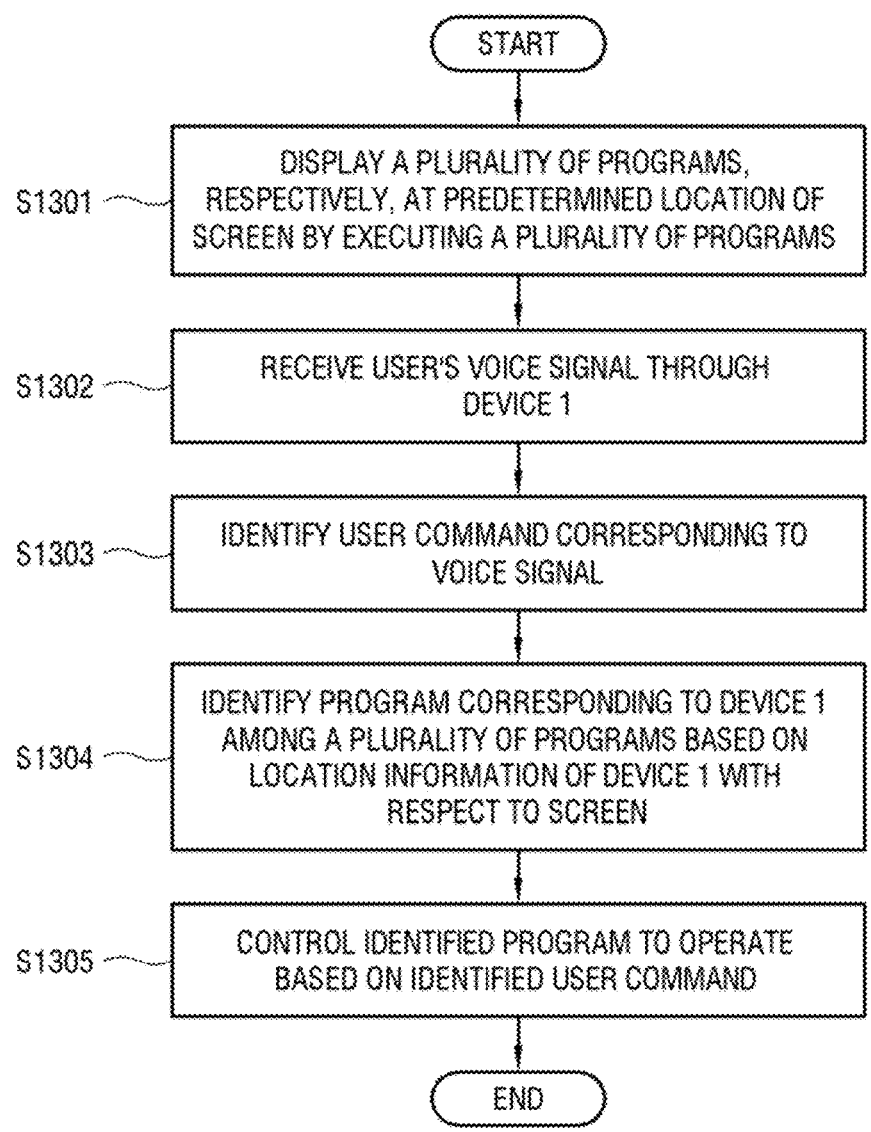

As another method for the processor 102 of the display device 100 according to the embodiment of the present disclosure to determine the program corresponding to the device receiving the voice signal, the processor 102 may determine the program corresponding to the device receiving the voice signal based on location information of the device with respect to the screen. This will be described with reference to FIG. 13.

The processor 102 of the display device 100 according to the embodiment executes the plurality of programs and displays the plurality of programs, respectively, on the display unit 103 (S1301). That is, the plurality of programs executed on the display device 100 are each displayed so as to be distinguishable by locations displayed on the screen. Thereafter, when the user's voice signal is received through the device 1 110 (S1302), the processor 102 determines the user command corresponding to the received voice signal (S1303).

Figure 14:
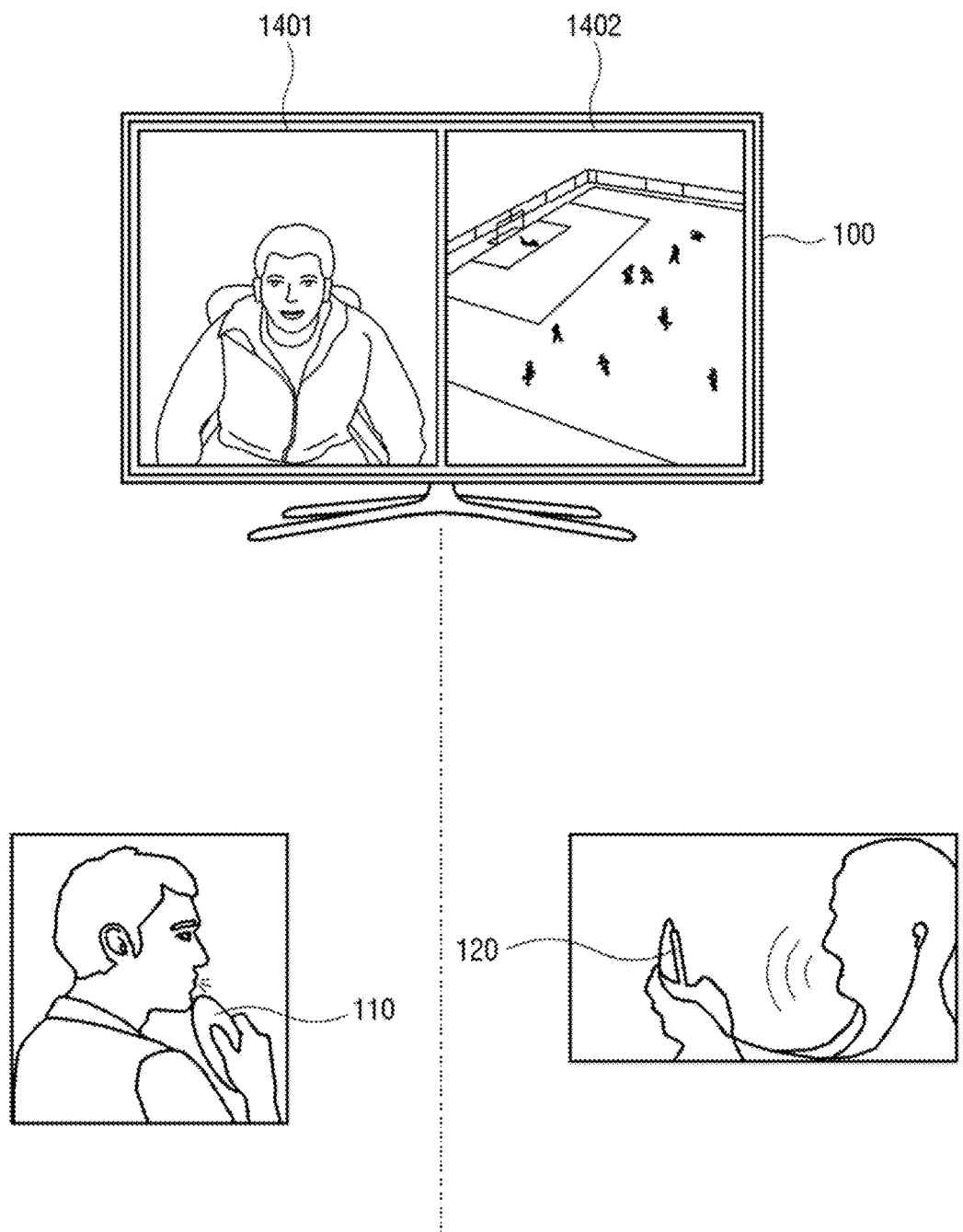

Meanwhile, the processor 102 determines the program corresponding to the device 1 110 among the plurality of programs based on the location information of the device 1 110 with respect to the screen (S1304). For example, as illustrated in FIG. 14, when two TV broadcast viewing programs 1401 and 1402 are being executed at the same time on the left and right of the screen of the display unit 103 of the display device 100, when the user's voice signal is received from the outside of the display device 100, the processor 102 grasps a relative location of the device to which the corresponding voice signal is transmitted based on the screen of the display unit 103 and determines a program corresponding to the corresponding device among the two TV broadcast viewing programs based on the relative location. For example, when the user's voice signal is received from the device 1 110, the processor 102 may grasp that the above voice signal is received from the device 1 110 located on the left in the direction of looking at the screen of the display device 100 and determine the first program 1401 located on the left of the screen among the programs being executed as the program corresponding to the device 1 110. As another example, when the user's voice signal is received from the device 2 120, the processor 102 may determine, as the program corresponding to the device 2 120, the second program 1402 located on the right side of the screen among the programs being executed in the same way. However, the number of programs executed on the display device 100 and the screen arrangement scheme are not limited thereto.

When the user command and the program corresponding to the received voice signal are determined based on the above process, the processor 102 controls to operate the determined program based on the determined user command (S1305).

Thereby, it is possible to more efficiently determine the control target program to the user's voice input intention by reflecting the location of the device receiving the user's voice signal.

Figure 17:
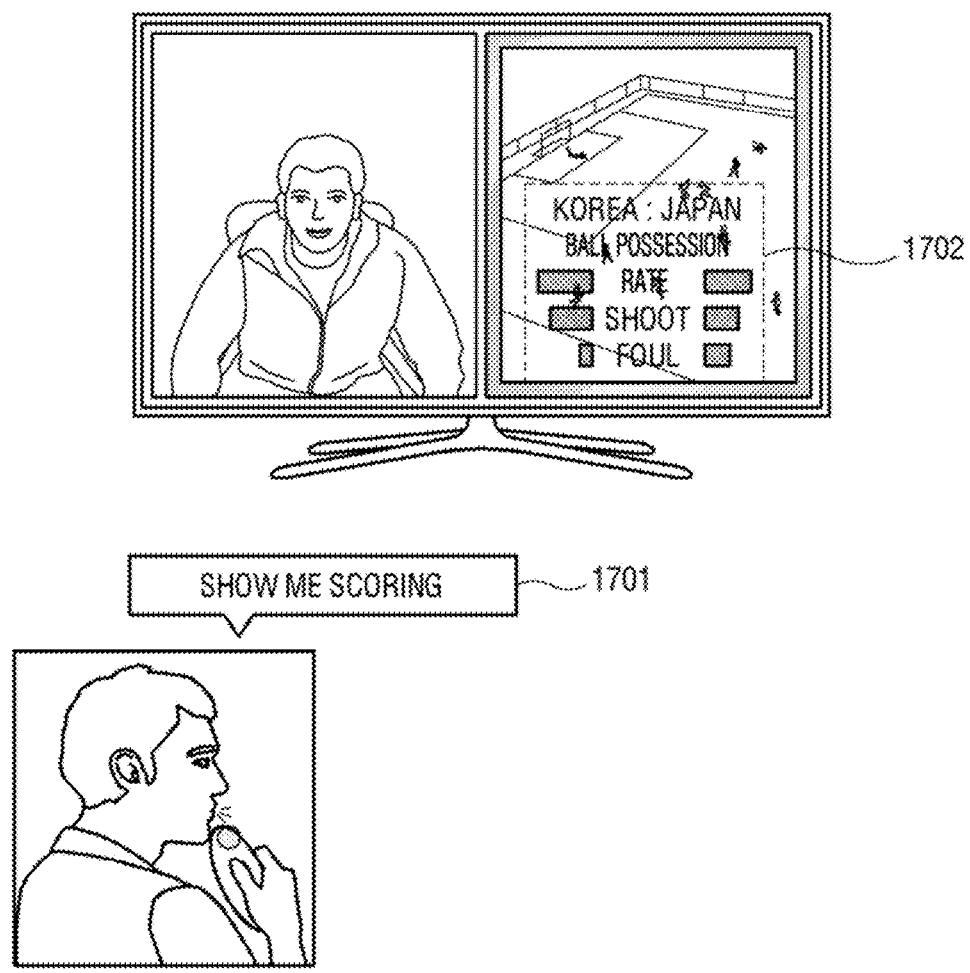

FIGS. 15 to 17 illustrate an example in which the processor 102 of the display device 100 according to the embodiment of the present disclosure displays a program determined to correspond to the device receiving the voice signal.

As illustrated in FIG. 15, when the two TV broadcast viewing programs 1401 and 1402 are being executed at the same time on the left and right sides of the screen of the display unit 103 of the display device 100, in the case in which the user only watches the broadcast program without any other operation, the processor 102 receives a broadcast signal and reproduces the received broadcast signal through each broadcast viewing program without special displays for each broadcast viewing program.

Then, when the user inputs the voice command through the device 1 110 to grab the device 1 110 to control one of the TV broadcast viewing programs or furthermore, brings the device 110 near a user's mouth, the processor 102 may detect the device 1 110 to visually distinguish and display the relationship between the device 1 110 and the program corresponding to the device 1 110. For example, as illustrated in FIG. 16, the processor 102 may highlight and display, in a predetermined color, a border of the program (for example, the program 1402 displayed on the right side of the screen) corresponding to the device 1 110 among the plurality of programs 1401 and 1402 being executed on the display device 100 (1601), and may display the same color as the color of the border on an LED of the device 1 110 corresponding to the program (1602). Thereby, a user who intuitively confirms the program corresponding to the control device 110 among the plurality of programs being executed may utter a voice control command for the corresponding program as illustrated in FIG. 17 (1701), and receive a result 1702 corresponding to the voice control command. However, the method of visually distinguishing and displaying the relationship between the device receiving the voice signal and the program corresponding to the device as described in the above example is not limited to the above example.

Thereby, among the plurality of programs being executed on the display device, the control can be performed in the state where the information on the program corresponding to the device to be controlled is directly visually confirmed, thereby improving the user convenience.

Figure 18:
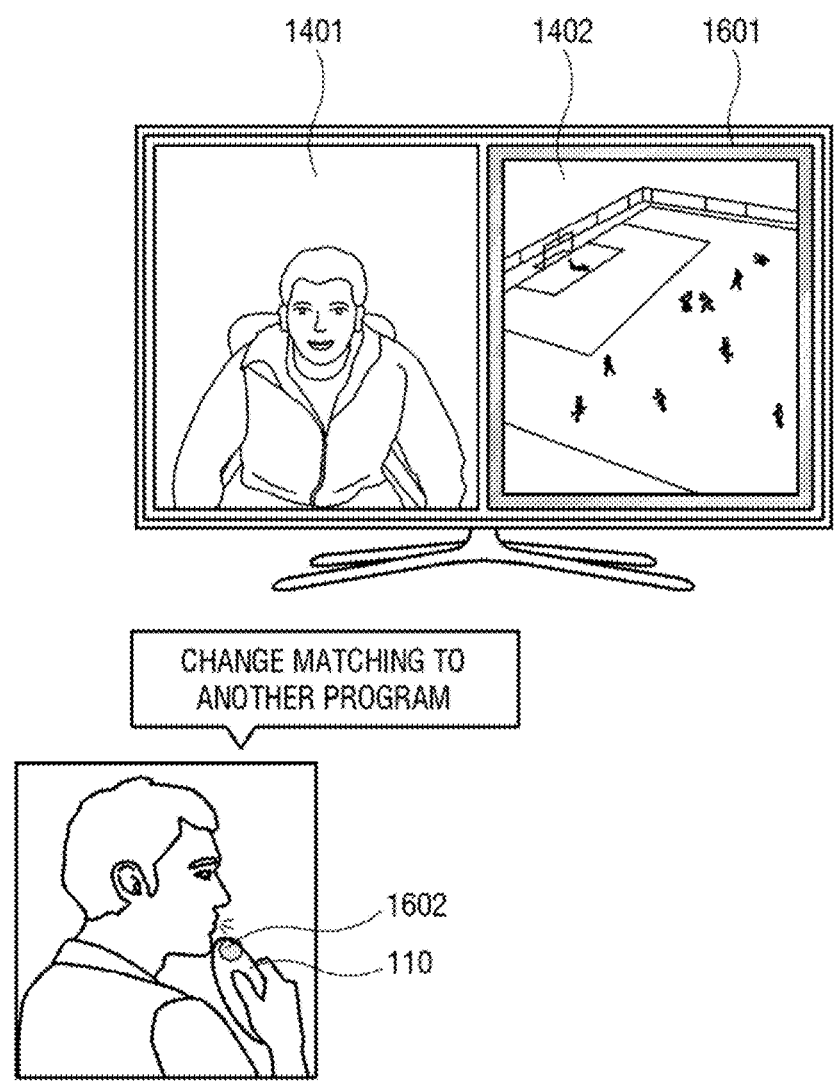

FIGS. 18 to 19 illustrate another example in which the processor 102 of the display device 100 according to the embodiment of the present disclosure changes the program corresponding to the device receiving the voice signal.

Although an example of changing the program corresponding to the device receiving the voice signal according to the user's selection through the UI has been described above with reference to FIG. 7, the method of changing the program corresponding to the device receiving the voice signal is not limited thereto. As another example, as in FIG. 16, the processor 102 may directly change a corresponding program through the user input in the state in which the relationship between the device receiving the voice signal and the program corresponding to the device is displayed to be visually distinguished.

For example, as illustrated in FIG. 18, when a voice (for example, "change matching to another program") requesting to change the corresponding program is received from the user through the device 1 110 in the state in which the device 1 110 and the program 1402 corresponding to the device 1 110 are highlighted and displayed in the same color (1601 and 1602), as illustrated in FIG. 19, the processor 102 may highlight and display the program 1401 different from the program previously corresponding to the device 1 110 (1701) and display a guide message (for example, "matching has been changed" (1902)) indicating that the corresponding program setting change is completed. Alternatively, the processor 102 may not directly display the corresponding program setting change complete message as described above, but may display a message requesting the confirmation input to the user once more for the changed setting. The latter may be more appropriate if the number of programs being executed are three or more. However, the method of visually displaying the process of changing the program corresponding to the device receiving the voice signal as described in the above example is not limited to the above example.

Thereby, among the plurality of programs being executed on the display device, the setting of the corresponding program can be changed in the state where the information on the program corresponding to the device to be controlled is visually confirmed, thereby improving the user convenience.

On the other hand, the example of determining the program corresponding to the device receiving the voice signal among the plurality of programs based on the device receiving the voice signal has been described above, but the present disclosure is not limited thereto. For example, the processor 102 of the display device 100 according to another embodiment of the present disclosure may determine a program corresponding to user's utterance among the plurality of programs by referring to user's utterance content. Specifically, when a plurality of utterances are input from a user in the state in which the plurality of programs are executed on the display device 100 and the images each are displayed on the screen of the display unit 103, the processor 102 of the display device 100 according to another embodiment of the present disclosure may determine a program corresponding to each user's utterance among the plurality of programs by referring to the user's utterance content. This will be described with reference to FIGS. 20 and 21.

Figure 20:
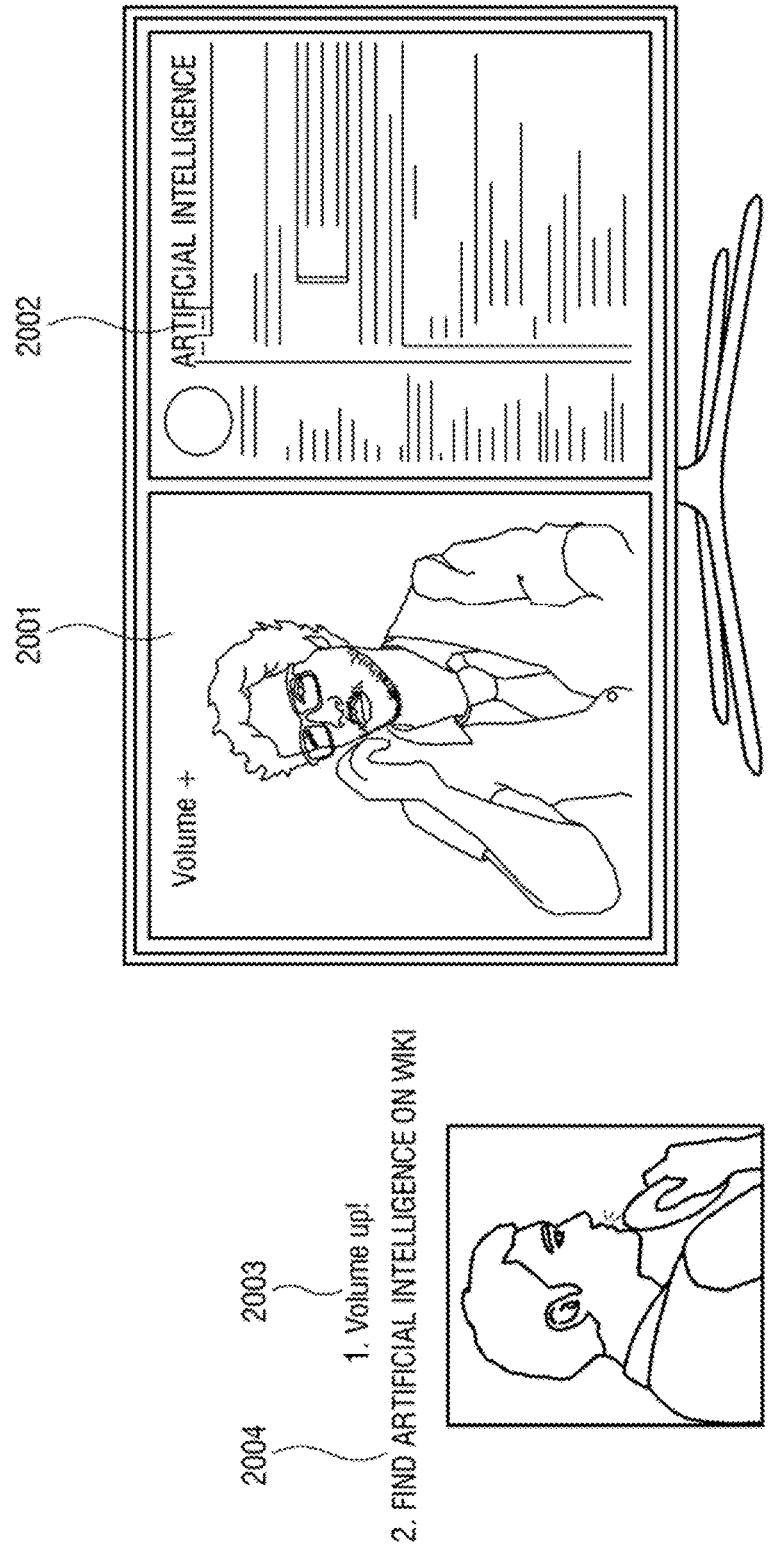
FIGS. 20 to 23 are diagrams illustrating another examples in which the processor according to the embodiment of the present disclosure determines a program.

For example, as illustrated in FIG. 20, when a user continuously utters two voices "volume up" 2003 and "find AI on Wiki" 2004 in the state in which an image playback program 2001 and a web browsing program 2002 are executed and the images of each program are displayed together on the screen of the display unit 103, the processor 102 determines that the first utterance "volume up" 2003 corresponds to the image playback program 2001 among the two programs 2001 and 2002 based on each utterance content, and performs control to turn up the volume for the image reproduction program 2001 based on the utterance. For the second utterance "find artificial intelligence on Wiki" 2004, the processor 102 also determines that the utterance corresponds to the web browsing program 2002 of the two programs 2001 and 2002 based on the utterance content, and controls to perform the operation of searching for the 'artificial intelligence' for the web browsing program 2002 based on the utterance.

Figure 21:
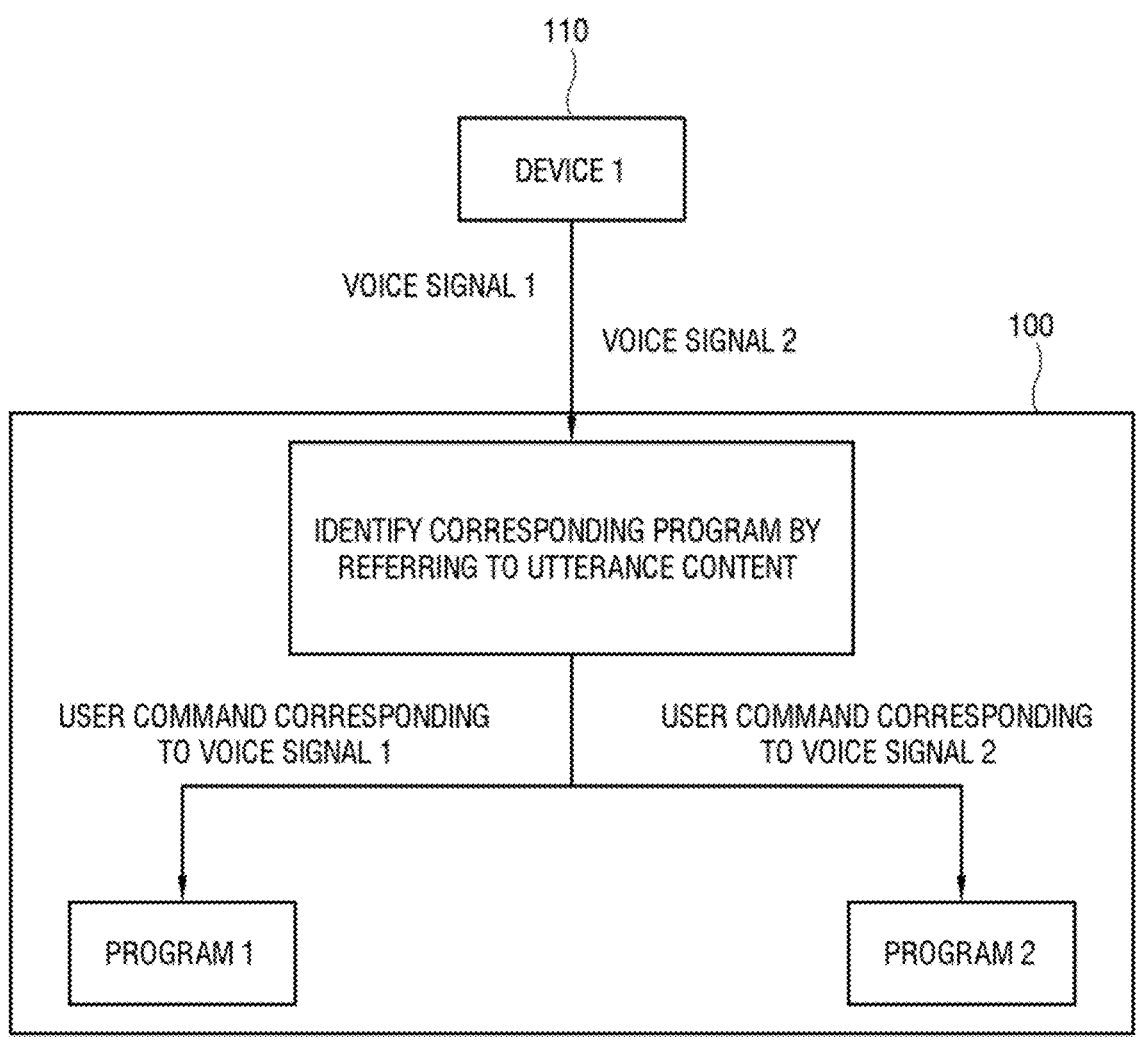

FIG. 21 is a diagram illustrating the above process, and illustrates that when the plurality of voice signals (for example, voice signals 1 and 2) are received through the device 1 110, the processor 102 of the display device 100 according to another embodiment of the present disclosure determines the programs corresponding to each voice signal by referring to the utterance content, and then controls the program 1 determined to correspond to the voice signal 1 by the user command corresponding to the voice signal 1, and controls the program 2 determined to correspond to the voice signal 2 by the user command corresponding to the voice signal 2.

Thereby, the program corresponding to the utterance content uttered by the user among the plurality of programs can be determined by referring to the utterance content, so it is possible to improve the reliability of the program determination.

As described above, the embodiment in which the program corresponding to the user's utterance content among the plurality of programs is determined by referring to the user's utterance content may be combined with another embodiment of the present disclosure described above. For example, the processor 102 of the display device 100 according to another embodiment of the present disclosure primarily attempts to determine the program corresponding to the device receiving the voice signal among the plurality of programs, and then may determine the corresponding program by further referring to the user's utterance content complementarily when the program is not determined. This will be described with reference to FIG. 22. On the other hand, the embodiment in which the recognition processing for the received voice signal is performed through the server is not described above in detail, but the recognition processing for the voice signal received in the display device 100 may be performed by the display device 100 itself and may be performed by an external server, and therefore is described based on the configuration of performing the voice recognition processing through the external server.

Figure 22:
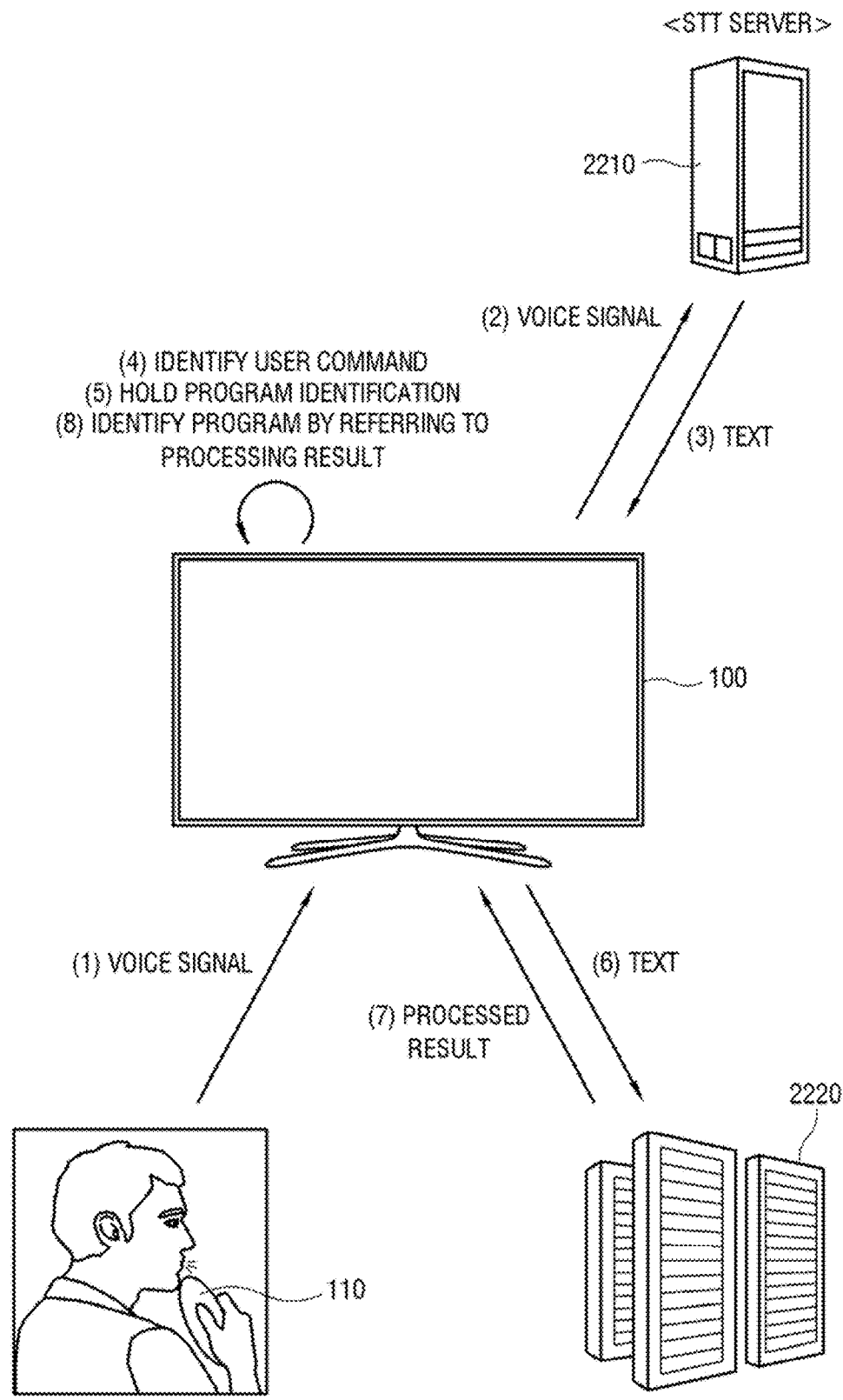

When the user's voice signal is received through the device 1 110 ((1) of FIG. 22), the processor 102 of the display device 100 according to another embodiment of the present disclosure determines the program corresponding to the device among the plurality of programs, and transmits the voice signal to an STT server 2210 ((2) of FIG. 22) and receives information on the text into which the voice signal is converted ((3) of FIG. 22). The processor 102 determines the user command corresponding to the user's voice signal based on the received text information ((4) of FIG. 22).

When the program corresponding to the device receiving the user's voice signal among the plurality of programs is determined, the processor 102 may control the determined program using the determined user command.

However, when the program corresponding to the user's voice signal among the plurality of programs may not be determined, for example, when two or more programs are set corresponding to the device receiving the voice signal or the two or more programs can correspond to each other as an analyzed result based on the category of the main function or the location information of the device receiving the voice signal, the target to be controlled is not determined through the determined user command, so the processor 102 may not perform control corresponding to the user's voice signal ((5) of FIG. 22). In this case, the processor 102 may determine the program corresponding to the user's voice signal by further referring to the text information received from the STT server 2210, that is, by further referring to the user's utterance content.

The processing of determining the program corresponding to the user's voice signal by further referring to the user's utterance content may be performed by the processor 102 itself, or may be performed by using the external server (for example, natural language processing server). As an example of the latter, if the content uttered by the user is close to the natural language and is difficult to be analyzed by the processor 102 itself, the processor 102 may transmit the text information to a natural language processing server 2220 ((6) of FIG. 22) and then determine the program corresponding to the user's voice signal by referring to the processed result ((7) of FIG. 22) received from the natural language processing server 2220 ((8) of FIG. 22). Alternatively, the processor 102 may receive a search result of performing an Internet search or the like based on data obtained by processing the text information from the natural language processing server 2220 and refer to the search result to determine the program corresponding to the user's voice signal.

Thereby, in addition to the information on the device receiving the voice signal, the corresponding program is determined by further referring to the user's utterance content, so the reliability of the program determination can be improved.

In the above, an embodiment is described in which the reliability of the program determination is increased by using the information on the user's utterance content or the user command corresponding to the user's utterance content to determine the program corresponding to the received voice signal, but in contrast, it is also possible to increase the efficiency of the user command determination by using the information on the program determined to correspond to the user command to determine the user command corresponding to the received voice signal. This will be described with reference to FIG. 23.

Figure 23:
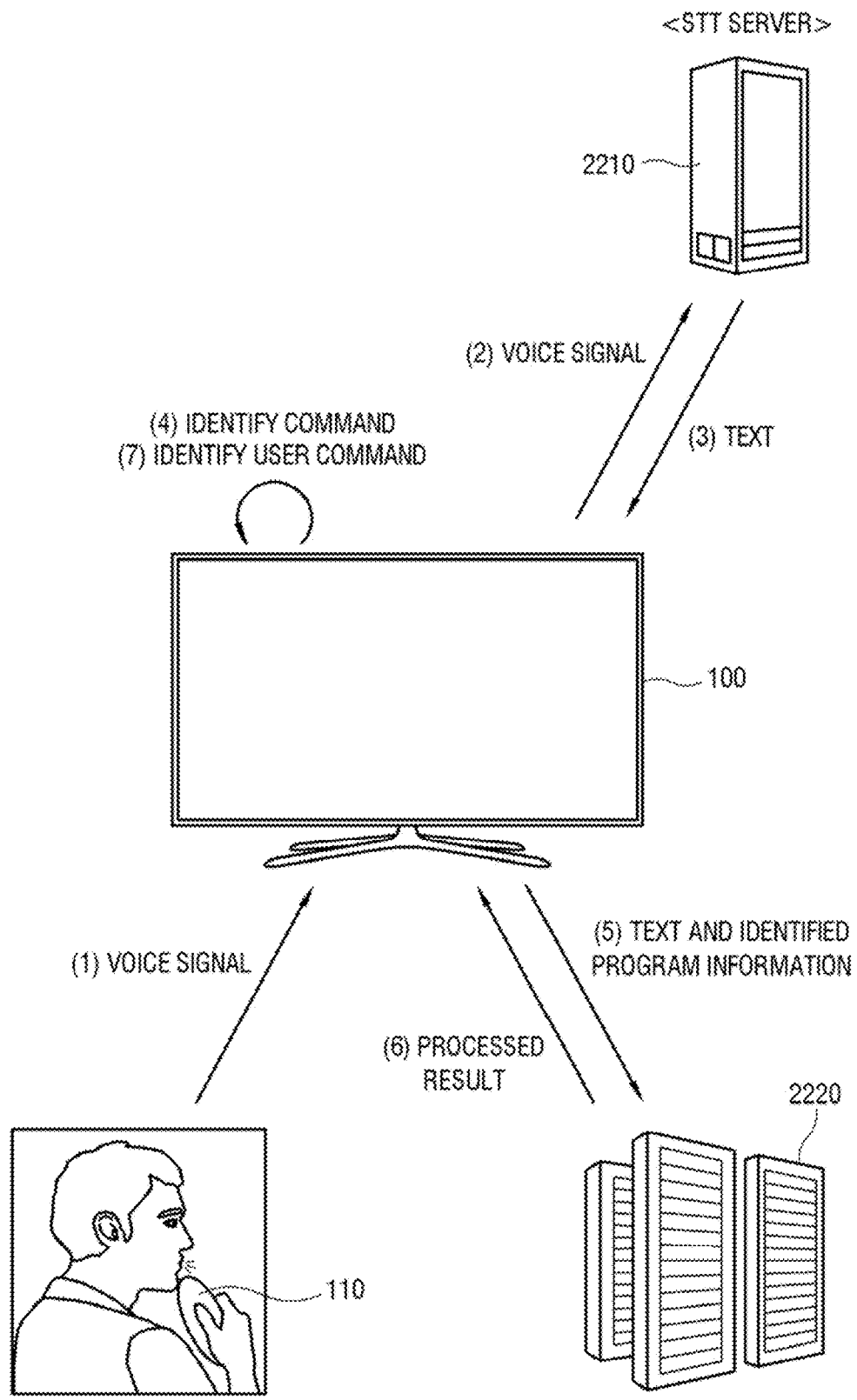

When the user's voice signal is received through the device 1 110 ((1) of FIG. 23), the processor 102 of the display device 100 according to another embodiment of the present disclosure transmits the voice signal to the STT server 2210 ((2) of FIG. 23) and receives the information on the text into which the voice signal is converted ((3) of FIG. 23), and determines the program corresponding to the device among the plurality of programs ((4) of FIG. 23).

The processor 102 in FIG. 22 determines the user command corresponding to the user's voice signal using the received text information. However, it may be inefficient to determine the user command corresponding to the voice signal without considering the voice signal which program the audio signal corresponds to because the range of the user command to be reviewed is wide. The user's utterance is not a simple instruction, but may not be a simpler instruction as the user's utterance is closer to the natural language. Accordingly, the processor 102 of FIG. 23 according to the present embodiment determines the user command corresponding to the voice signal by referring to the information on the program determined as the program corresponding to the device receiving the voice signal, along with the text information.

The processing of determining the user command corresponding to the voice signal by referring to the text information and the determined program information together may be performed by the processor 102 itself as described above, or may be performed by using the external server (for example, the natural language processing server). In the latter case, the processor 102 may transmit the text information corresponding to the voice signal and the determined program information to the server 2220 for processing ((6) of FIG. 23), and receive the processing result ((6) of FIG. 23) to determine the user command. In this case, the natural language processing server 2220 may analyze the text information in the natural language processing process to reduce the range of the user command to be reviewed by using the determined program information, thereby improving the analysis speed.

Thereby, by using the information on the program determined as the program corresponding to the device receiving the voice signal to determine the user command, the speed of determining the user command is improved, and as a result, the processing speed of the display device through the voice recognition can be also improved.

The invention claimed is:

1. A display device, comprising:
 a display;
 a voice input receiver; and
 a processor configured to:
 control the display to display an image of at least one of a plurality of programs by performing a function of the plurality of programs,
 receive a user voice input through the voice input receiver from at least one of a plurality of devices,
 identify a program corresponding to a device receiving the user voice input among the plurality of programs based on matching information corresponding to a mutual correspondence between the plurality of programs and the plurality of devices, and
 control the identified program to perform a function corresponding to the received user voice input,
 wherein the processor is further configured to, based on at least one of information on a category of a main function of the device receiving the user voice input or information on whether the device receiving the user voice input is a device set as a main device or a device set as a sub device, identify the program corresponding to the device among the plurality of programs.

2. The display device of claim 1, further comprising:
 a user input including the voice input receiver,
 wherein the processor is configured to display a UI setting the matching information on the display, and set the matching information according to a user's input through the user input based on the UI.

3. The display device of claim 1, wherein
 the processor is configured to identify, as the program corresponding to the main device, a program executed in a mode in which an image is displayed among a plurality of programs being executed.

4. The display device of claim 1, wherein the processor is configured to receive an execution command for a first program from a first device to execute the first program, and identify the first program as a program corresponding to the first device when the user voice input is received through the first device.

5. The display device of claim 1, wherein the processor is configured to identify the program corresponding to the device receiving the user voice input based on location information of the device receiving the user voice input with respect to the display.

6. The display device of claim 1, wherein the processor is configured to identify the program corresponding to the device receiving the user voice input by further referring to user's utterance content corresponding to the user voice input.

7. The display device of claim 1, wherein the processor is configured to identify a user command corresponding to the received user voice input by further referring to information on the identified program.

8. A method for controlling a display device, comprising:
displaying an image of at least one of a plurality of programs by performing a function of the plurality of programs;
receiving a user voice input through a voice input receiver of the display device from any one of a plurality of devices;
identifying a program corresponding to a device receiving the user voice input among the plurality of programs based on matching information corresponding to a mutual correspondence between the plurality of programs and the plurality of devices; and
controlling the identified program to perform a function corresponding to the received user voice input,
wherein the identifying comprises, based on at least one of information on a category of a main function of the device receiving the user voice input or information on whether the device receiving the user voice input is a device set as a main device or a device set as a sub device, identifying the program corresponding to the device among the plurality of programs.

9. The method of claim 8, further comprising:
displaying a UI setting the matching information; and
setting the matching information according to a user's input based on the UI.

10. The method of claim 8, wherein, in the identifying, a program executed in a mode in which an image is displayed among a plurality of programs being executed is identified as a program corresponding to the main device.

11. The method of claim 8, wherein in the identifying, an execution command for a first program from a first device is received to execute the first program, and the first program is identified as a program corresponding to the first device when the user voice input is received through the first device.

12. The method of claim 8, wherein in the identifying, the program corresponding to the device receiving the user voice input is identified based on location information of the device receiving the user voice input with respect to the display.

13. The method of claim 8, wherein in the identifying, the program corresponding to the device receiving the user voice input is identified by further referring to user's utterance content corresponding to the user voice input.

\* \* \* \* \*